(12) United States Patent
Singh et al.

(10) Patent No.: US 12,148,541 B2
(45) Date of Patent: *Nov. 19, 2024

(54) VENTILATED CASK FOR NUCLEAR WASTE STORAGE

(71) Applicant: HOLTEC INTERNATIONAL, Camden, NJ (US)

(72) Inventors: Krishna P. Singh, Jupiter, FL (US); Stephen J. Agace, Voorhees, NJ (US); Robert Mahorter, Ocean City, NJ (US)

(73) Assignee: HOLTEC INTERNATIONAL

( * ) Notice: Subject to any disclaimer, the term of this patent is extended or adjusted under 35 U.S.C. 154(b) by 0 days.

This patent is subject to a terminal disclaimer.

(21) Appl. No.: 18/232,380

(22) Filed: Aug. 10, 2023

(65) Prior Publication Data
US 2023/0386692 A1 Nov. 30, 2023

Related U.S. Application Data

(63) Continuation of application No. 17/470,053, filed on Sep. 9, 2021, now Pat. No. 11,735,327.

(60) Provisional application No. 63/223,578, filed on Jul. 20, 2021, provisional application No. 63/211,234, filed on Jun. 16, 2021.

(51) Int. Cl.
*G21F 5/10* (2006.01)
*G21F 5/00* (2006.01)
*G21F 5/008* (2006.01)

(52) U.S. Cl.
CPC ............... *G21F 5/10* (2013.01); *G21F 5/008* (2013.01)

(58) Field of Classification Search
CPC .................................. G21F 5/008; G21F 5/10
USPC ......... 250/505.1, 506.1, 507.1, 515.1, 516.1, 250/517.1, 518.1, 519.1
See application file for complete search history.

(56) References Cited

U.S. PATENT DOCUMENTS

| | | | |
|---|---|---|---|
| 4,498,011 A | 2/1985 | Dyck et al. |
| 4,527,066 A | 7/1985 | Dyck et al. |
| 5,839,874 A | 11/1998 | Johnston |
| 6,519,307 B1 | 2/2003 | Singh |
| 6,718,000 B2 | 4/2004 | Singh |
| 6,805,815 B1 | 10/2004 | Soundararajan |
| 8,798,224 B2 | 8/2014 | Singh |
| 8,995,604 B2 | 3/2015 | Singh et al. |
| 9,208,914 B2 | 12/2015 | Singh et al. |
| 10,049,777 B2 | 8/2018 | Singh |

(Continued)

*Primary Examiner* — Nicole M Ippolito
(74) *Attorney, Agent, or Firm* — The Belles Group, P.C.

(57) ABSTRACT

A natural passively cooled ventilated cask includes a cavity which holds a canister containing heat and radiation emitting spent nuclear fuel assemblies or other high level wastes. Ambient ventilation or cooling air is drawn inwards beneath the cask and vertically upwards into a lower portion of the cavity through air inlet ducts formed integrally with a bottom canister support structure coupled to the cask. The air heated by the canister flows upwards in the cavity and returns to atmosphere through air outlet ducts in the cask lid. Air circulation is driven via natural convective thermosiphon flow. Structural standoff members elevate the bottom of the cask above a concrete base pad forming an air inlet plenum beneath the canister support structure. The lateral sidewall surface of the cask has no penetrations for the air inlets, which eliminates any streaming path for radiation emanating from the spent nuclear fuel.

9 Claims, 22 Drawing Sheets

(56) References Cited

U.S. PATENT DOCUMENTS

| | | |
|---|---|---|
| 10,145,754 B2 | 12/2018 | Takeda |
| 10,332,642 B2 | 6/2019 | Singh |
| 10,515,730 B2 | 12/2019 | Singh et al. |
| 10,714,223 B2 | 7/2020 | Singh |
| 10,861,612 B2 | 12/2020 | Singh et al. |
| 10,878,973 B2 | 12/2020 | Singh |
| 11,043,312 B2 | 6/2021 | Singh |
| 11,250,963 B2 | 2/2022 | Singh |
| 11,735,327 B2 * | 8/2023 | Singh .................. G21F 5/10 250/506.1 |
| 2003/0147486 A1 | 8/2003 | Singh et al. |
| 2010/0284506 A1 | 11/2010 | Singh |
| 2014/0329455 A1 | 11/2014 | Singh |
| 2014/0341330 A1 | 11/2014 | Singh |
| 2015/0243391 A1 | 8/2015 | Singh |
| 2019/0131024 A1 | 5/2019 | Pfeifer |
| 2019/0139661 A1 | 5/2019 | Singh |
| 2019/0326028 A1 | 10/2019 | Singh |
| 2020/0027612 A1 | 1/2020 | Singh |
| 2020/0035371 A1 | 1/2020 | Arai et al. |
| 2021/0012915 A1 | 1/2021 | Singh |
| 2021/0057120 A1 | 2/2021 | Singh |
| 2021/0407697 A1 | 12/2021 | Singh et al. |

\* cited by examiner

VENTILATED CASK FOR NUCLEAR WASTE STORAGE

CROSS-REFERENCE TO RELATED APPLICATIONS

The present application is a continuation of U.S. patent application Ser. No. 17/470,053 filed Sep. 9, 2021, which claims the benefit of U.S. Provisional Application No. 63/211,234 filed Jun. 16, 2021 and U.S. Provisional Application No. 63/223,578 filed Jul. 20, 2021; which are all incorporated herein by reference in their entireties.

BACKGROUND

The present invention relates generally to ventilated overpacks or casks used for dry storage and/or transport of high level nuclear waste from nuclear power generating plants or other nuclear facilities.

In the operation of nuclear reactors, the nuclear energy source is typically in the form of a plurality of hollow Zircaloy tubes each filled with enriched uranium pellets, which are collectively arranged in assemblages referred to as fuel assemblies. When the energy in the fuel assembly has been depleted to a certain predetermined level, the fuel assembly is removed from the nuclear reactor and referred to as used or spent nuclear fuel ("SNF"). The standard structure used to package or store the SNF assemblies discharged from light water reactors for off-site shipment or on-site dry storage is an all-welded stainless steel container. Such containers are well known and may be variously referred to as multi-purpose canisters (MPCs) such as those available from Holtec International of Camden, New Jersey, or dry storage canisters (DSCs).

Regardless of their name, these SNF canisters are characterized by a relatively thin-walled stainless shell to effectively transmit heat emitted by the decaying the SNF assemblies across the canister's wall boundary. The stainless steel shell has several full through-thickness continuous seam welds, including longitudinal seam welds and girth welds such as those that connect the shell to the top and bottom end closure plates. A fuel basket is typically arranged inside a metallic storage canister which defines an array of prismatic-shaped storage cells each of which is sized to hold a single fuel assembly, which in turn comprises a plurality of individual spent nuclear fuel rods.

A single canister is in turn stored and enclosed inside its own outer vertically ventilated module referred to as an overpack or cask. The casks are heavy radiation shielded vessels which block gamma and neutron radiation emitted from the SNF assemblies which passes through the canister shell and end plates. The ventilated casks are used for safe transport and/or storage of the multiple spent fuel assemblies within the inner fuel basket.

In addition to emitting neutron and gamma radiation requiring protective shielding, the highly radioactive SNF in the fuel assemblies (or other high level nuclear waste which may be stored in the waste canister) still produces considerable heat which must be dissipated to avoid damage to the fuel assemblies and spent fuel cladding stored in the canister. Ventilated casks use available ambient ventilation air to cool the canister and remove the heat emitted therefrom to protect the fuel assembly. Some casks have lateral ventilation openings in the sides and/or the lids which can create a path for radiation streaming to the ambient environment in some cases.

Improvements in ventilated casks used to store high level nuclear waste are therefore desired.

BRIEF SUMMARY

An improved nuclear waste storage system comprising a radiation-shielded ventilated cask for storing a nuclear fuel canister therein is provided. In one embodiment, the lateral side surfaces of the cask body does not have penetrations or openings for air ventilation, which eliminates any potential lateral or radial streaming paths for radiation emanating from the spent nuclear fuel (SNF) or other high level radioactive waste stored inside the canister in the cask. To achieve this, the present cask in one embodiment comprises a unique concrete-filled canister support structure at bottom. This radiation-shielded bottom closure structure supports the canister and is configured with integral inlet ducts which draw ambient cooling air into the internal cavity of the cask through downwardly open air inlets in the bottom baseplate of the canister support structure via a natural convective thermo-siphon flow effect. The canister support structure is configured to elevate and space the baseplate and concomitantly the cask above the concrete base pad on which the cask is positioned during use. This allows the cooling air to be drawn radially/horizontally inwards beneath the cask and then flow upwards through the air inlet in a vertical axial direction parallel to the vertical longitudinal or centerline axis of the cask. An air inlet plenum is formed between the base pad and baseplate of the cask.

Cooling air drawn into the cask continues to rise upward in a ventilation annulus formed in the internal cavity between the cask body and canister as the air is heated by the hot canister. The heated air is returned back to the ambient environment through air outlet ducts integrally formed in the radiation-shielded top lid of the cask. The lid is mounted on the cask body and configured such that there is no macro-path for leakage of radiation in the lateral or radial direction to the environment. The cask is configured for above-grade mounting in one embodiment so that ambient cooling air can readily reach the air inlet plenum from 360 degrees around the cask and becomes mixed before entering the cask. This plenum nullifies any pressure differentials surrounding the case cause by directional wind flow which enhance equal cooling of the entire canister inside the cask.

The downwardly open inlet ducts in the canister support structure are circuitously configured to eliminate any downwards straight line of sight through the ducts to prevent outward straight line radiation streaming from inside the cask. In one non-limiting embodiment, the air inlet ducts may have a generally Z-shaped transverse cross-sectional shape. In the unlikely event any radiation stream path were to occur, the straight-line radiation streaming would still be directed downwards from the air inlet towards the thick concrete base pad on which the cask is seated rather than in a radial or lateral direction where nuclear storage site workers might be present or near a boundary or fenced perimeter of the nuclear waste storage facility. The concrete base pad and soil below on which the pads rest are effective radiation shielding materials which act to block or absorb any escaping downwardly-directed radiation streaming.

The air outlet ducts in the cask lid are structured and circuitously configured as well to eliminate both upwards straight line radiation streaming and any laterally open air outlet penetrations in the side of the lid. Instead, the heated air is discharged back to atmosphere through the top of the lid via a protective cap structure.

In one aspect, a passively ventilated nuclear waste storage cask comprises: an elongated cask body defining a top, a bottom, a sidewall, and an internal cavity extending between the top and bottom along a vertical centerline axis of the cask, the internal cavity being configured for holding a nuclear waste storage canister; a lid attached to the top of the cask body; an air outlet formed in the lid; a downwardly open air inlet formed in the bottom of the cask body in fluid communication with the internal cavity and ambient atmosphere; and a canister support structure configured to support the canister in the internal cavity and engage a base pad, the canister support structure further configured elevate the bottom of the cask body above the base pad; wherein ambient cooling air is drawn in a flow path radially inwards beneath the bottom of the cask body and vertically upwards into the internal cavity through the air inlet.

According to another aspect, a passively ventilated nuclear waste storage system comprises: an elongated cask defining a top, a bottom, a sidewall, and an internal cavity extending between the top and bottom along a vertical centerline axis of the cask; a canister configured for holding nuclear waste, the canister positioned in the internal cavity of the cask and forming a circumferentially-extending ventilation annulus between the canister and cask; a lid attached to the top of the cask and comprising an air outlet in fluid communication with the internal cavity and ambient atmosphere; a concrete filled canister support structure disposed at the bottom of the cask and supporting the canister; a plurality of standoff members protruding downwards from the canister support structure which support and elevate the bottom of the cask from a base pad to form an air inlet plenum in fluid communication with ambient air; and air inlet ductwork formed through the canister support structure and in fluid communication with the ventilation annulus and air inlet plenum; wherein the air inlet ductwork is configured to draw ambient cooling air radially inwards into the air inlet plenum and the ventilation annulus via natural thermo-siphon effect driven by heat emitted from the canister.

According to another aspect, a method for operating a passively ventilated nuclear fuel storage system comprises: providing a cask comprising an internal cavity and an ambient air ventilation system in fluid communication with the internal cavity and atmosphere; inserting a canister containing nuclear waste emitting heat into the internal cavity of a cask and onto a canister support structure fixedly coupled to the cask; drawing ambient cooling air into an air inlet plenum formed beneath the cask; flowing the cooling air upwards from the air inlet plenum through the canister support structure into the internal cavity of the cask; heating the cooling air in the internal cavity of the cask; and discharging the heated cooling air to atmosphere through a lid coupled to a top of the cask.

BRIEF DESCRIPTION OF THE DRAWINGS

The present invention will become more fully understood from the detailed description and the accompanying drawings, wherein like elements are labeled similarly and in which.

Figure 1:
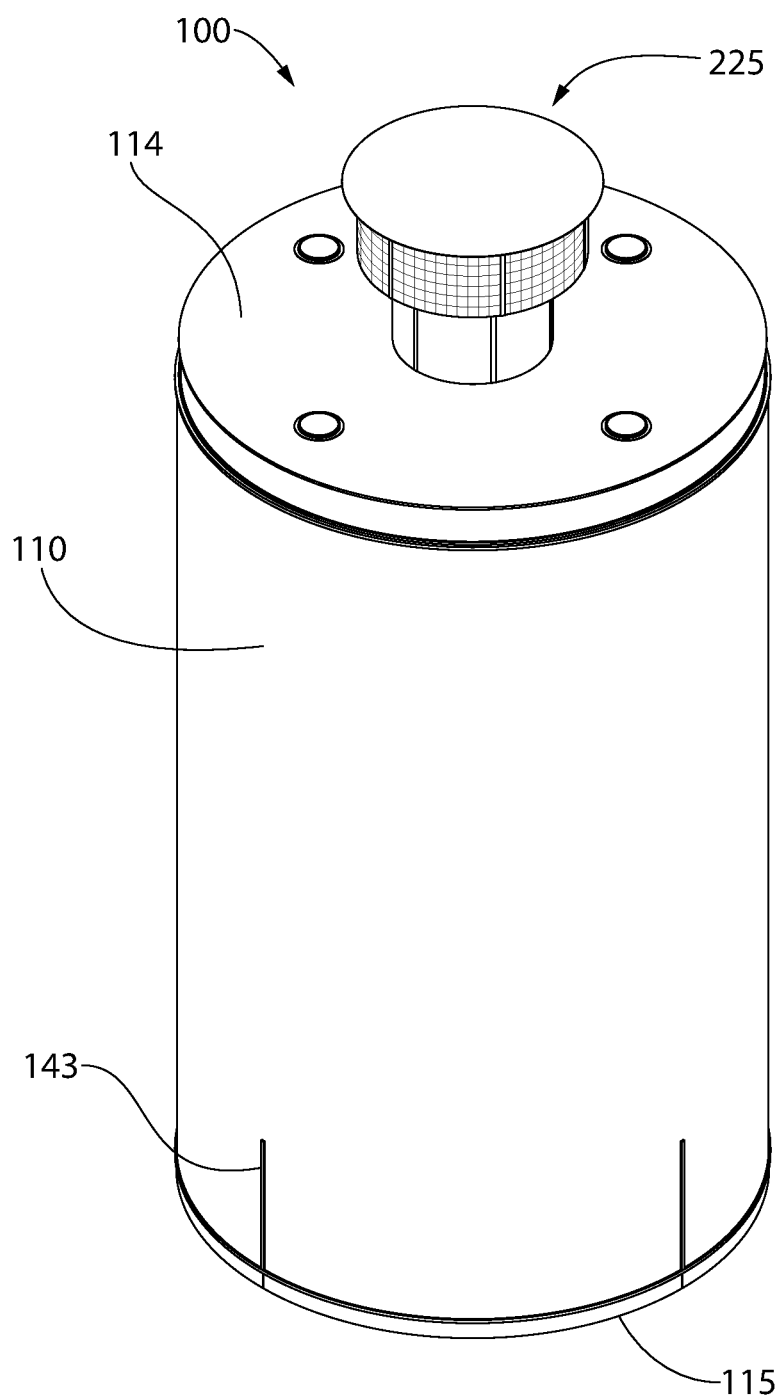
FIG. 1 is a top perspective view of a passively ventilated cask with for storing high level nuclear radioactive waste material such as spent nuclear fuel.
Figure 2:
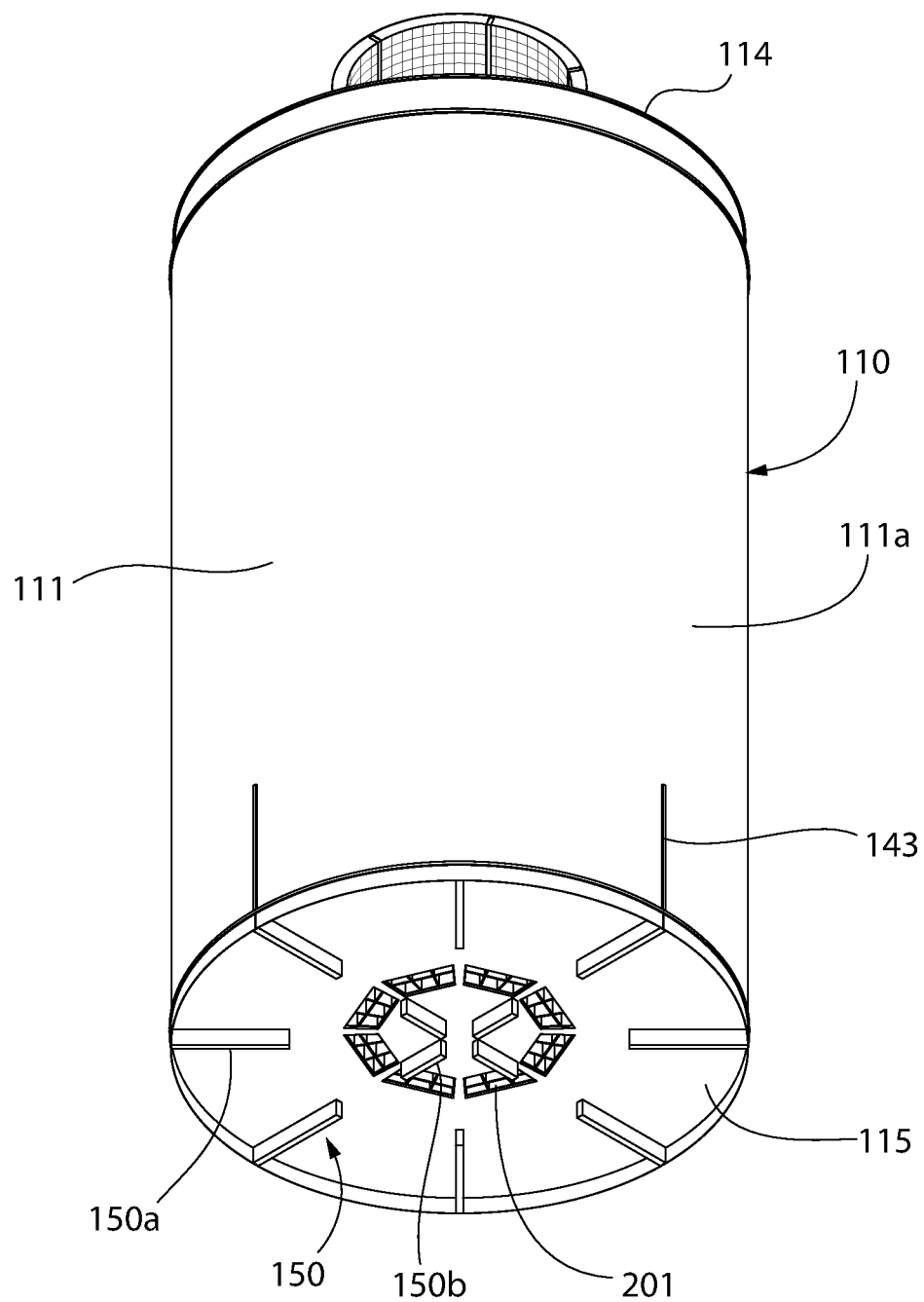
FIG. 2 is a bottom perspective view thereof.
Figure 3:
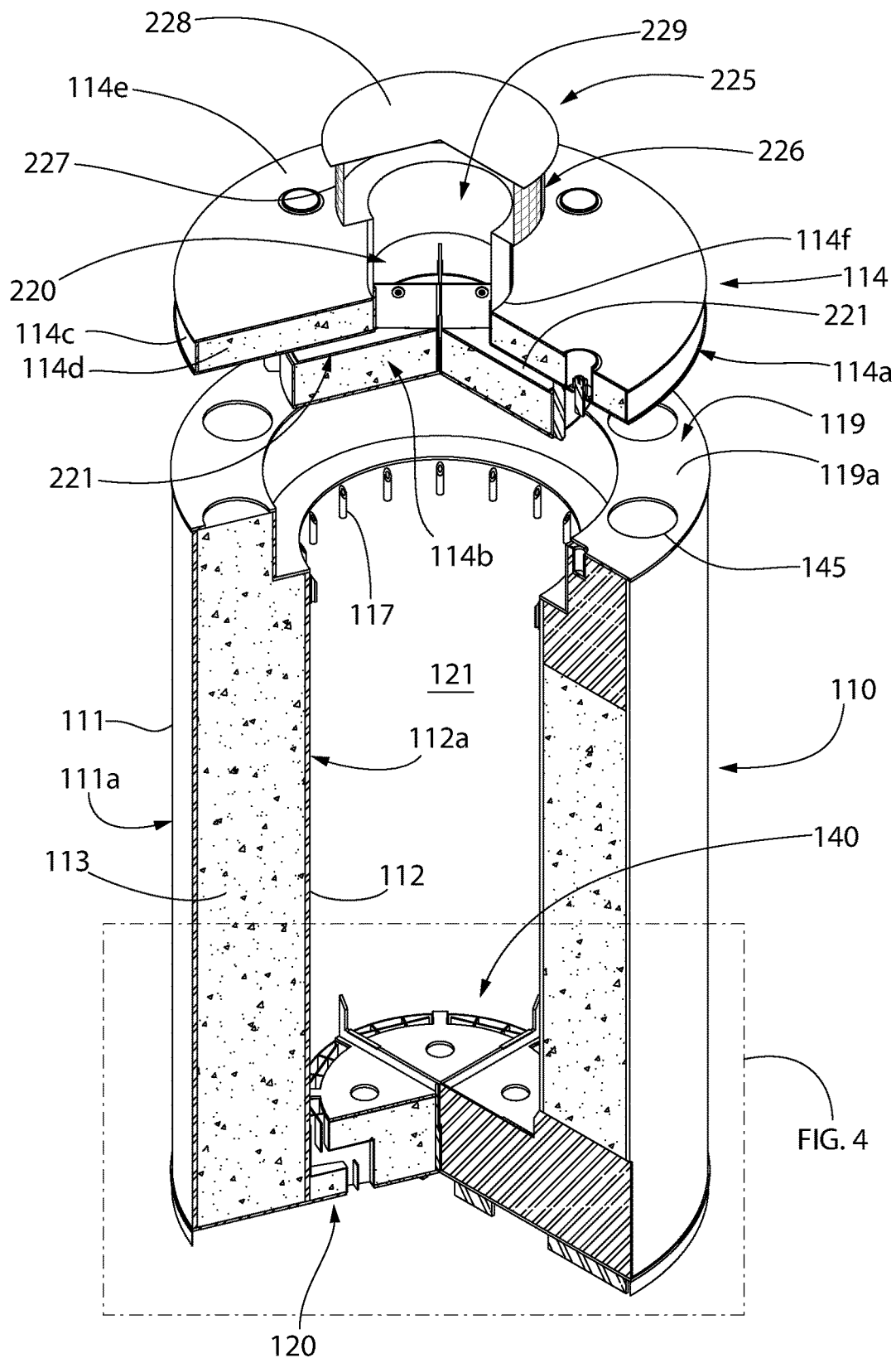
FIG. 3 is a vertical partial cross-sectional perspective view thereof.
Figure 4:
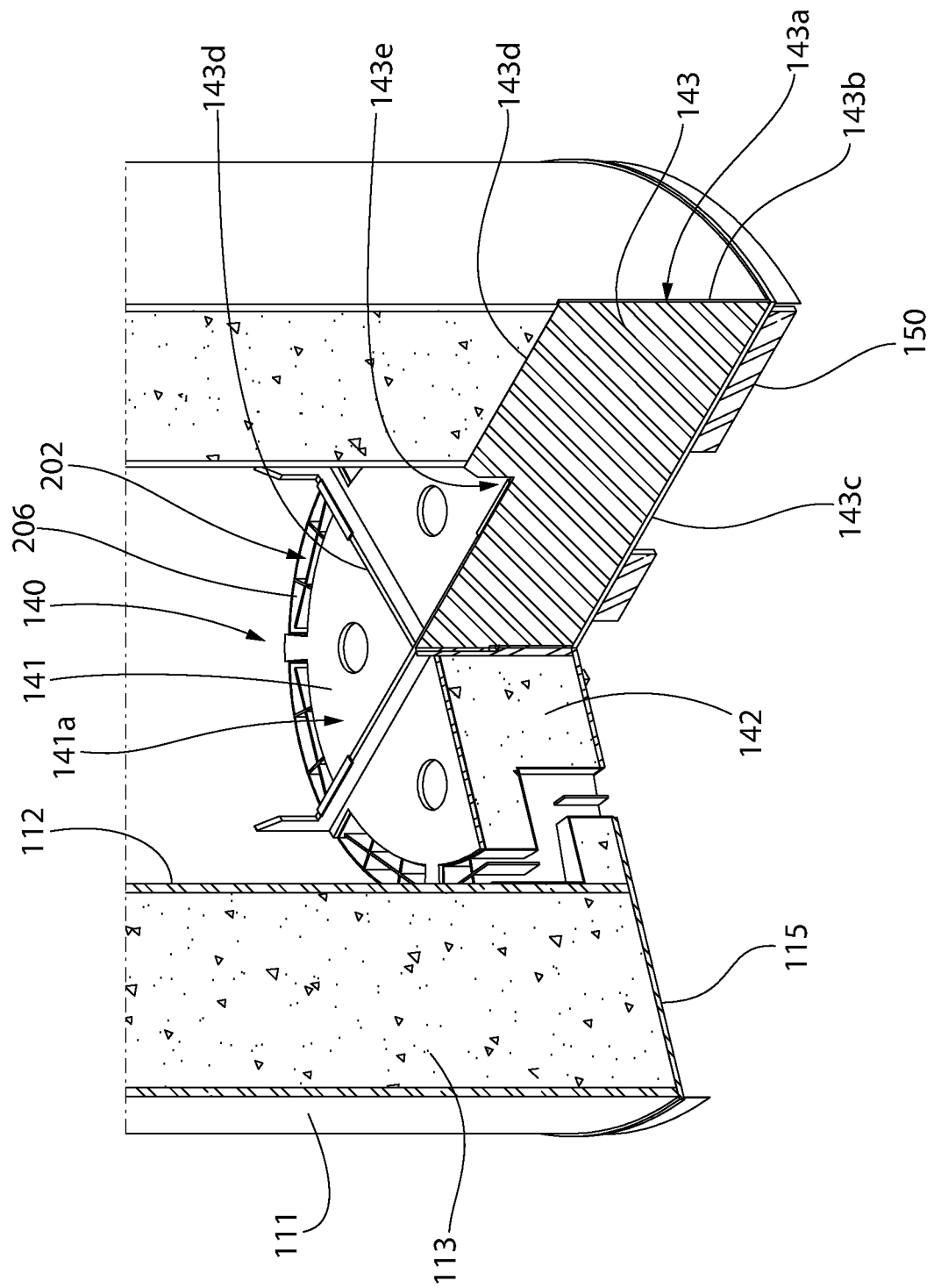
FIG. 4 is an enlarged detail taken from FIG. 3.
Figure 5:
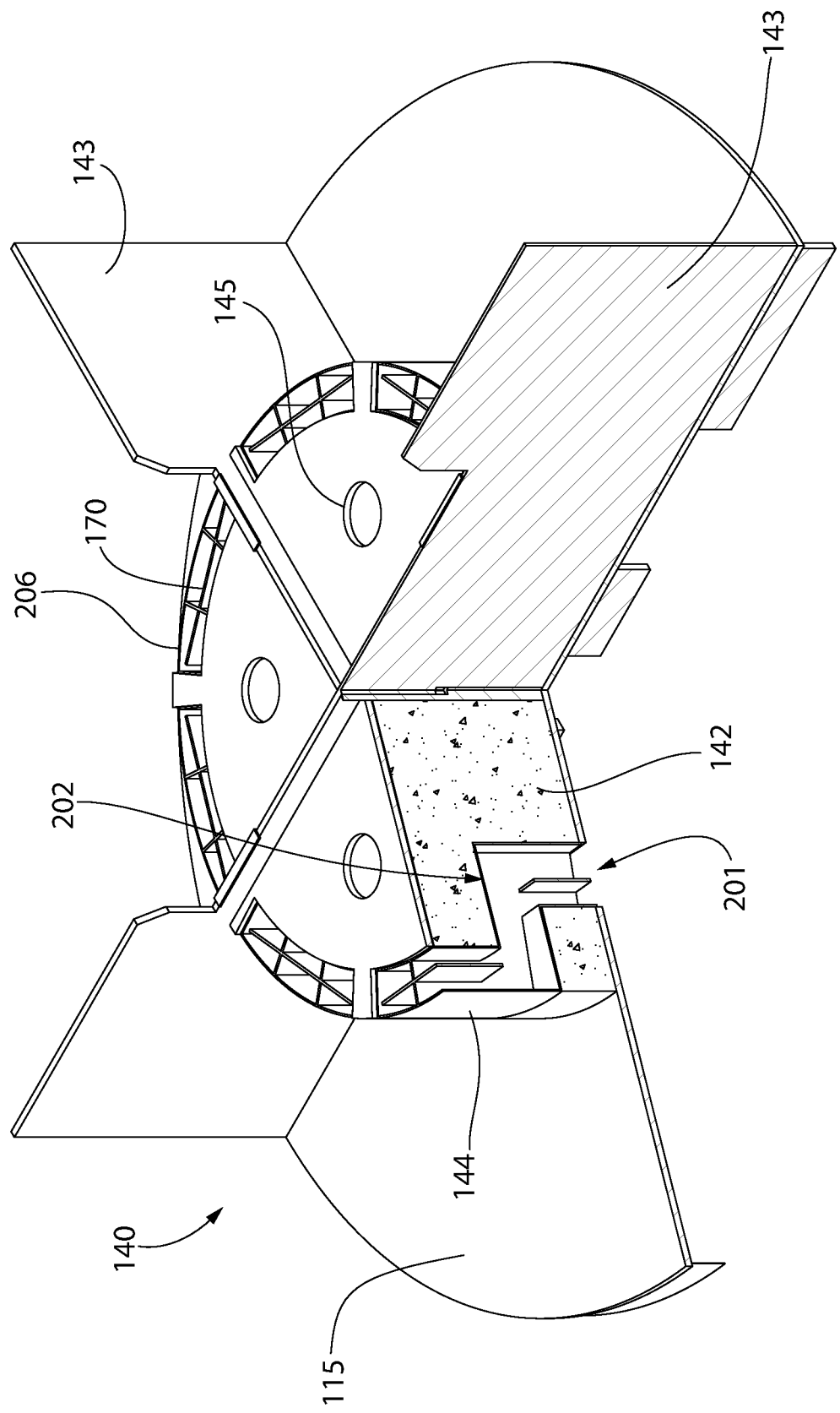
FIG. 5 is a top perspective view of a bottom canister support structure of the cask.
Figure 6:
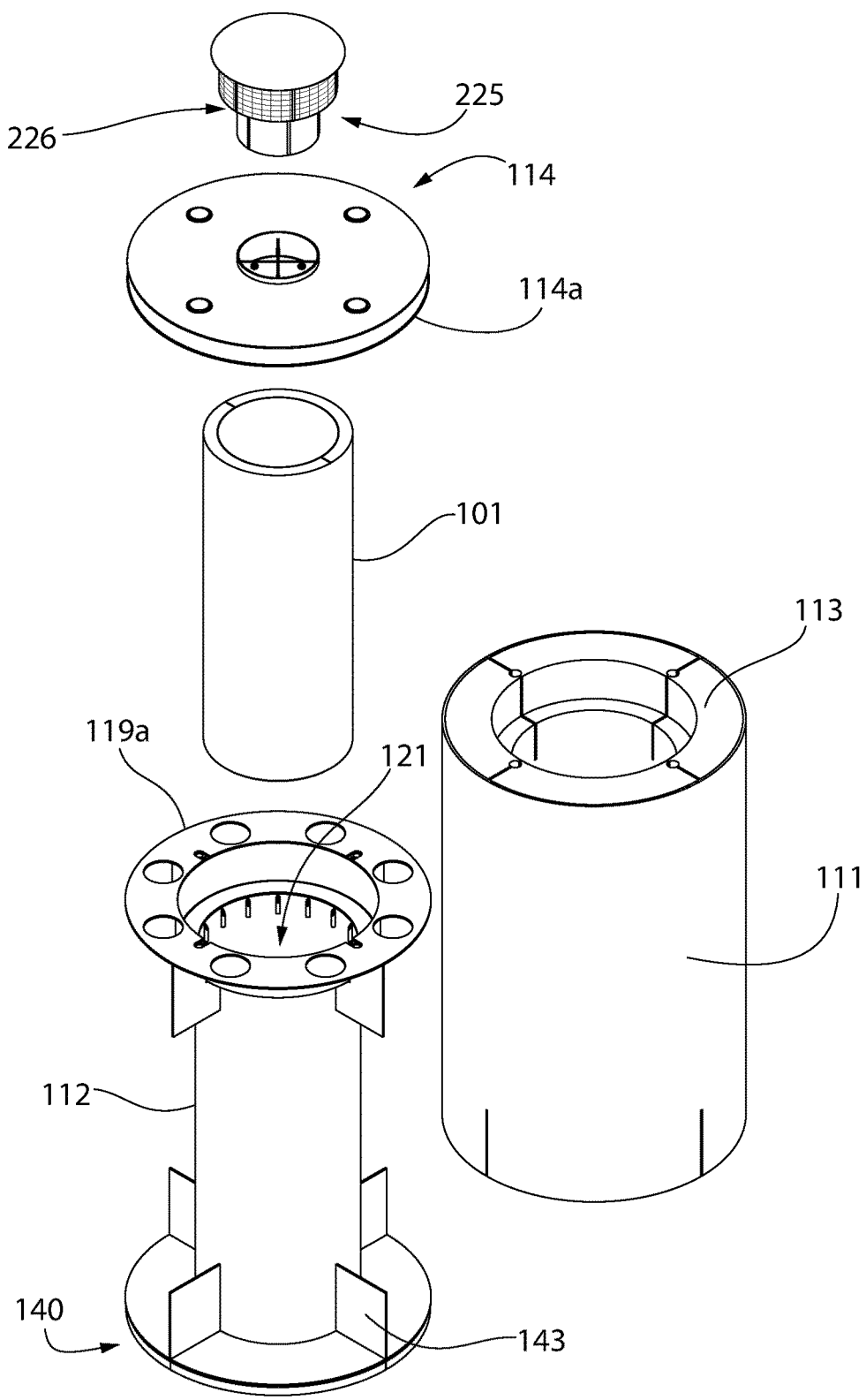
FIG. 6 is a top exploded perspective view of the cask.
Figure 7:
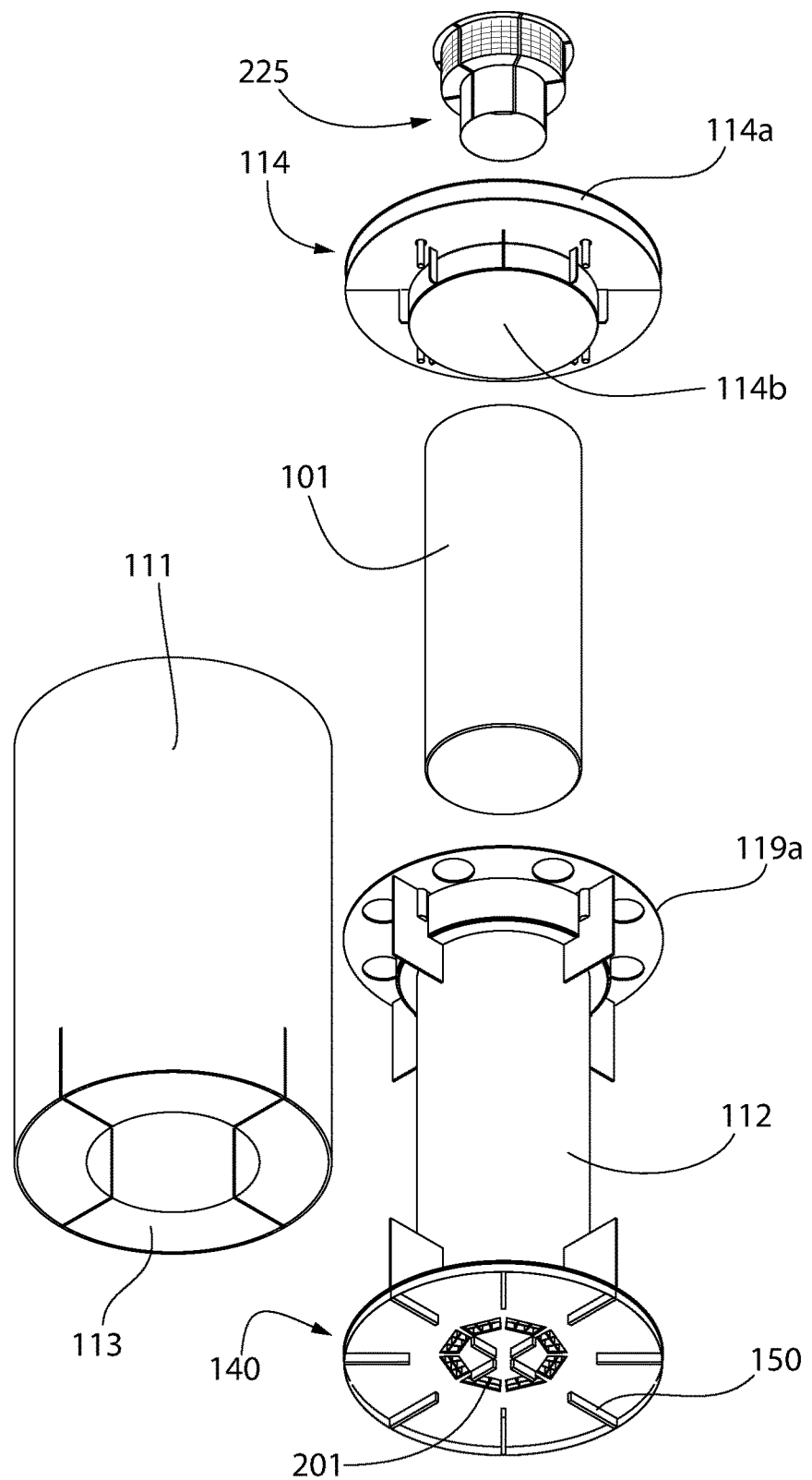
FIG. 7 is a bottom exploded perspective view of the cask.
Figure 8:
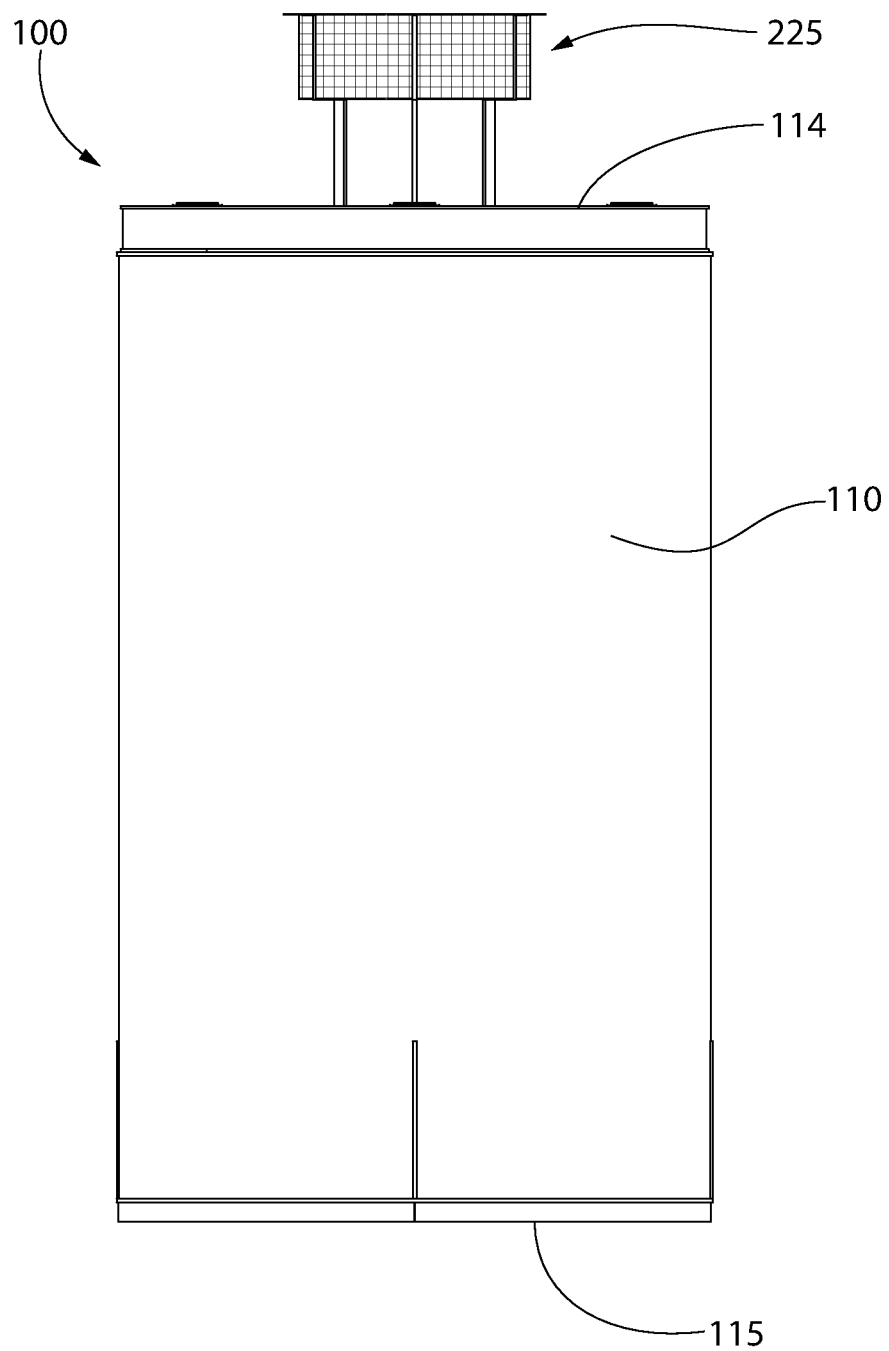
FIG. 8 is a side view of the cask.
Figure 9:
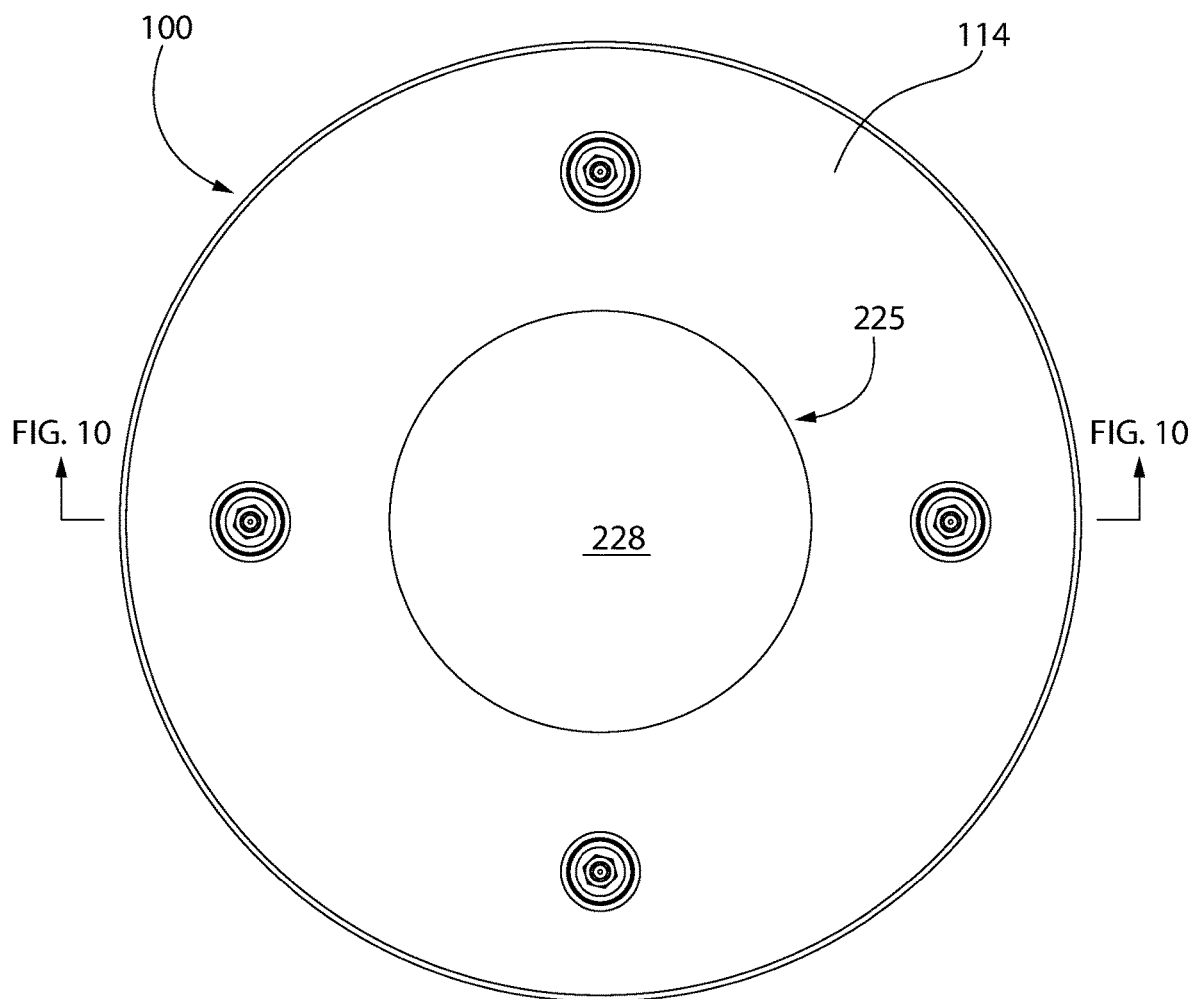
FIG. 9 is a top view of the cask.
Figure 10:
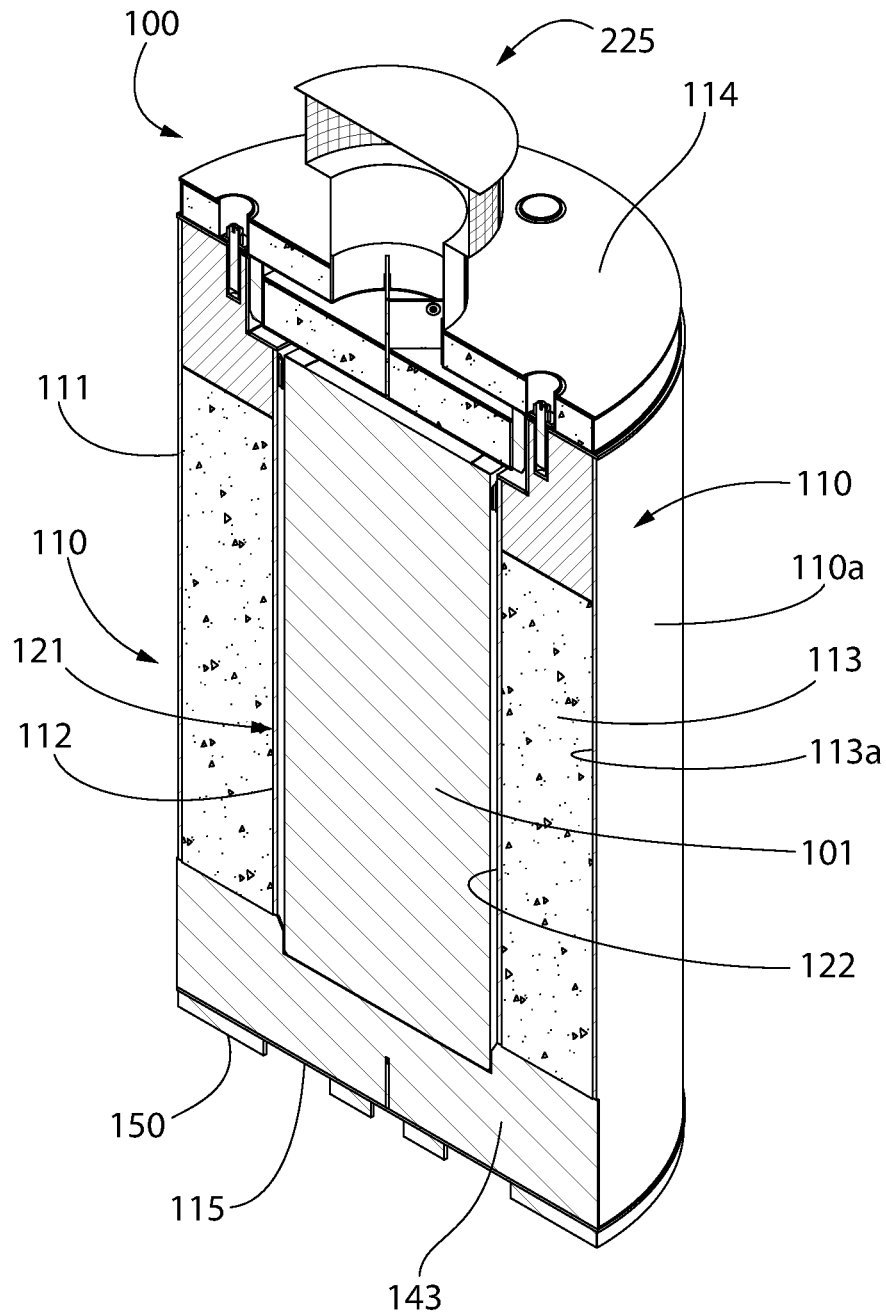
FIG. 10 is a full vertical cross-sectional perspective view of the cask.
Figure 11:
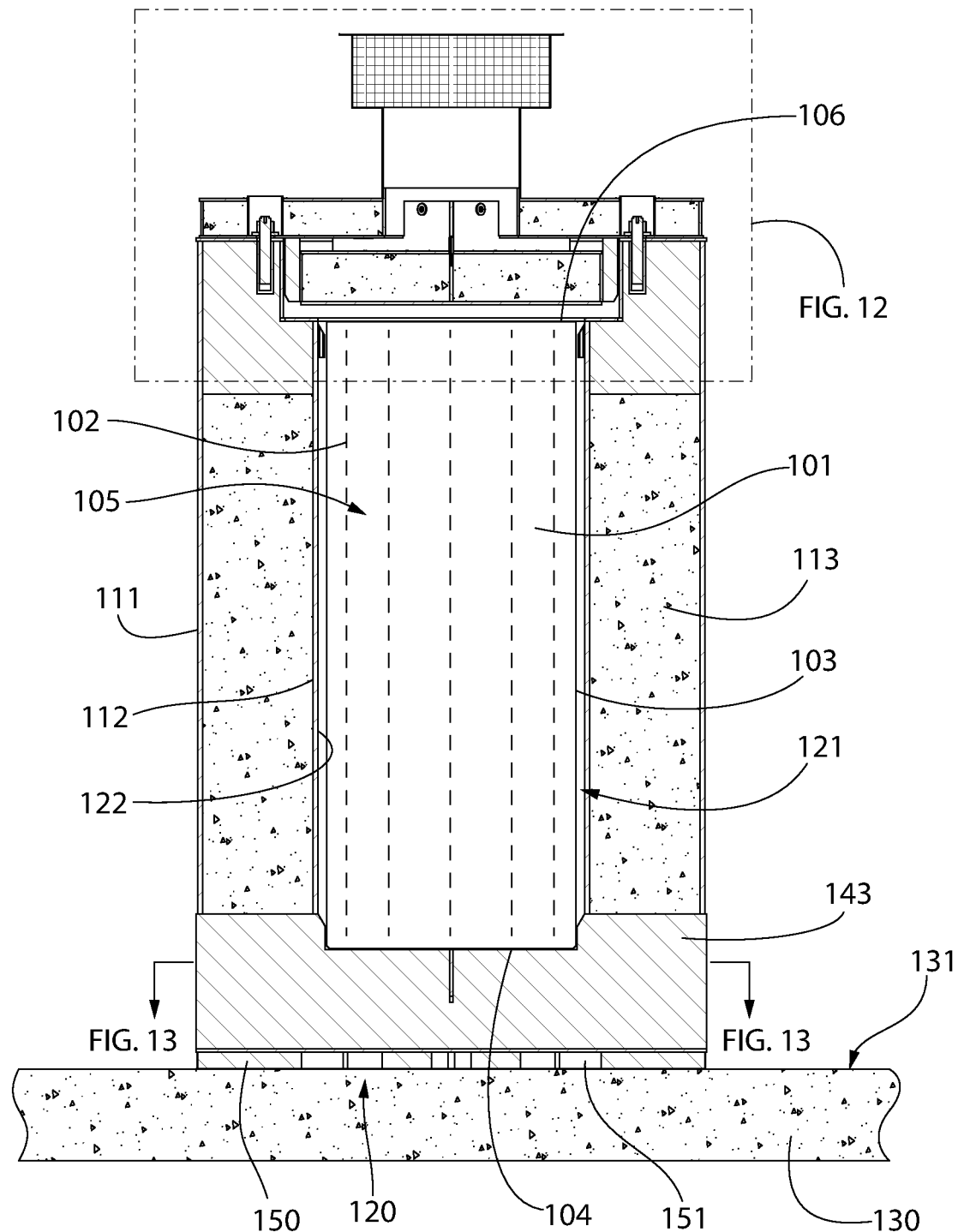
FIG. 11 is a full vertical side cross-sectional perspective view of the cask.
Figure 12:
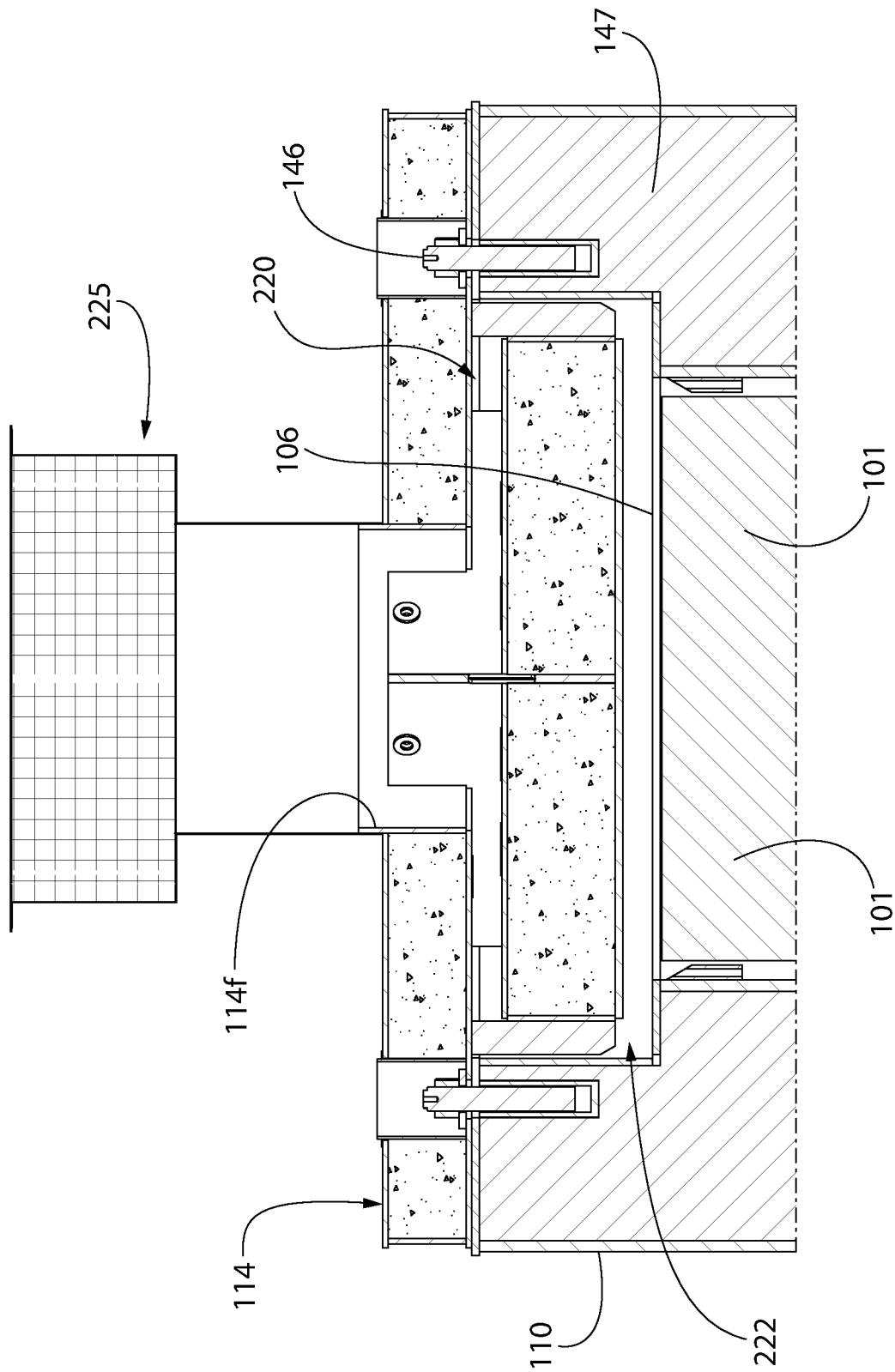
FIG. 12 is a partial vertical cross-sectional view of the upper portion of the cask and lid.
Figure 13:
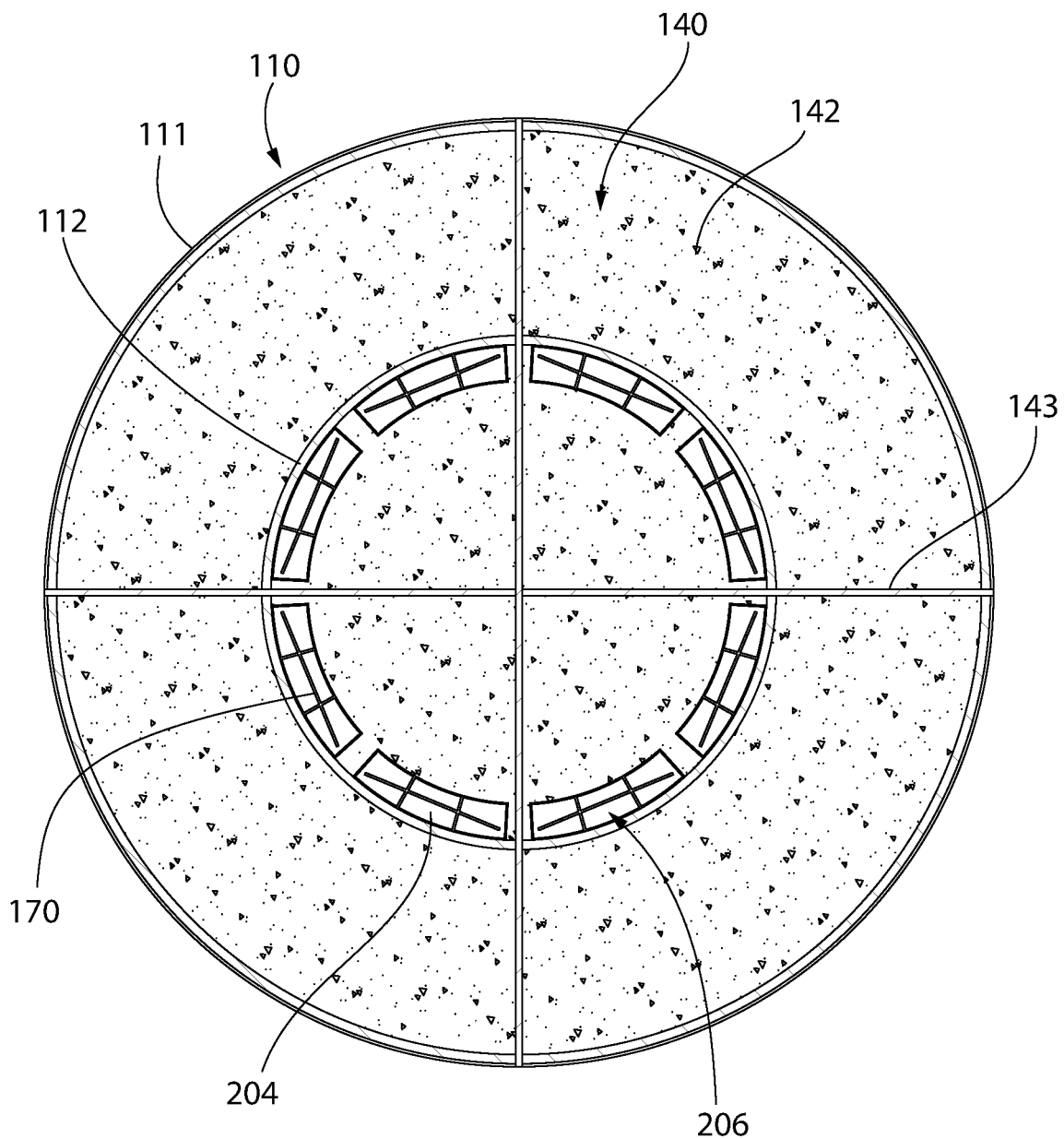
FIG. 13 is a transverse/horizontal cross sectional view of the canister support structure of the cask.
Figure 14:
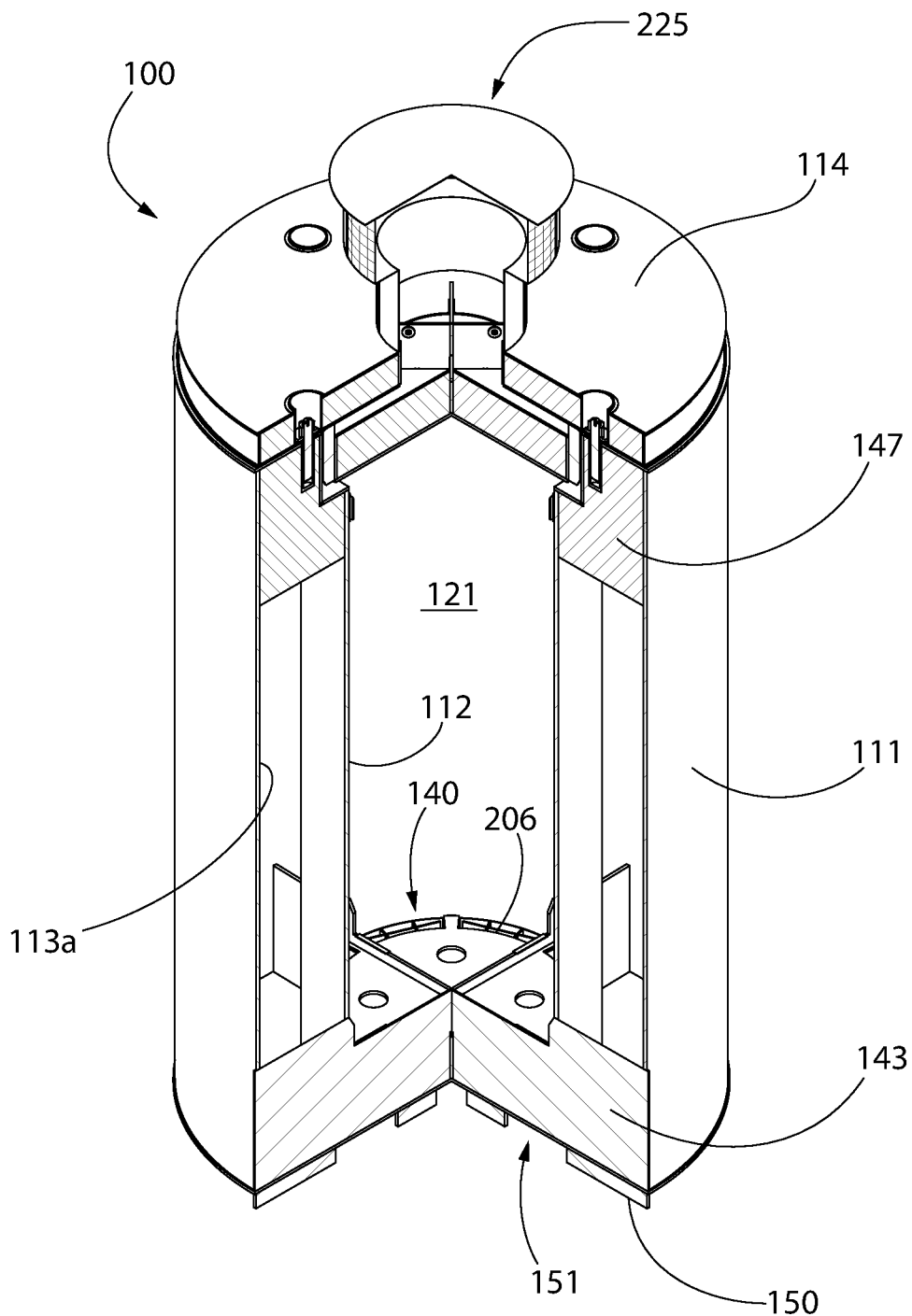
FIG. 14 is a vertical partial cross-sectional perspective view of the of the cask with concrete liner of the sidewall not shown.
Figure 15:
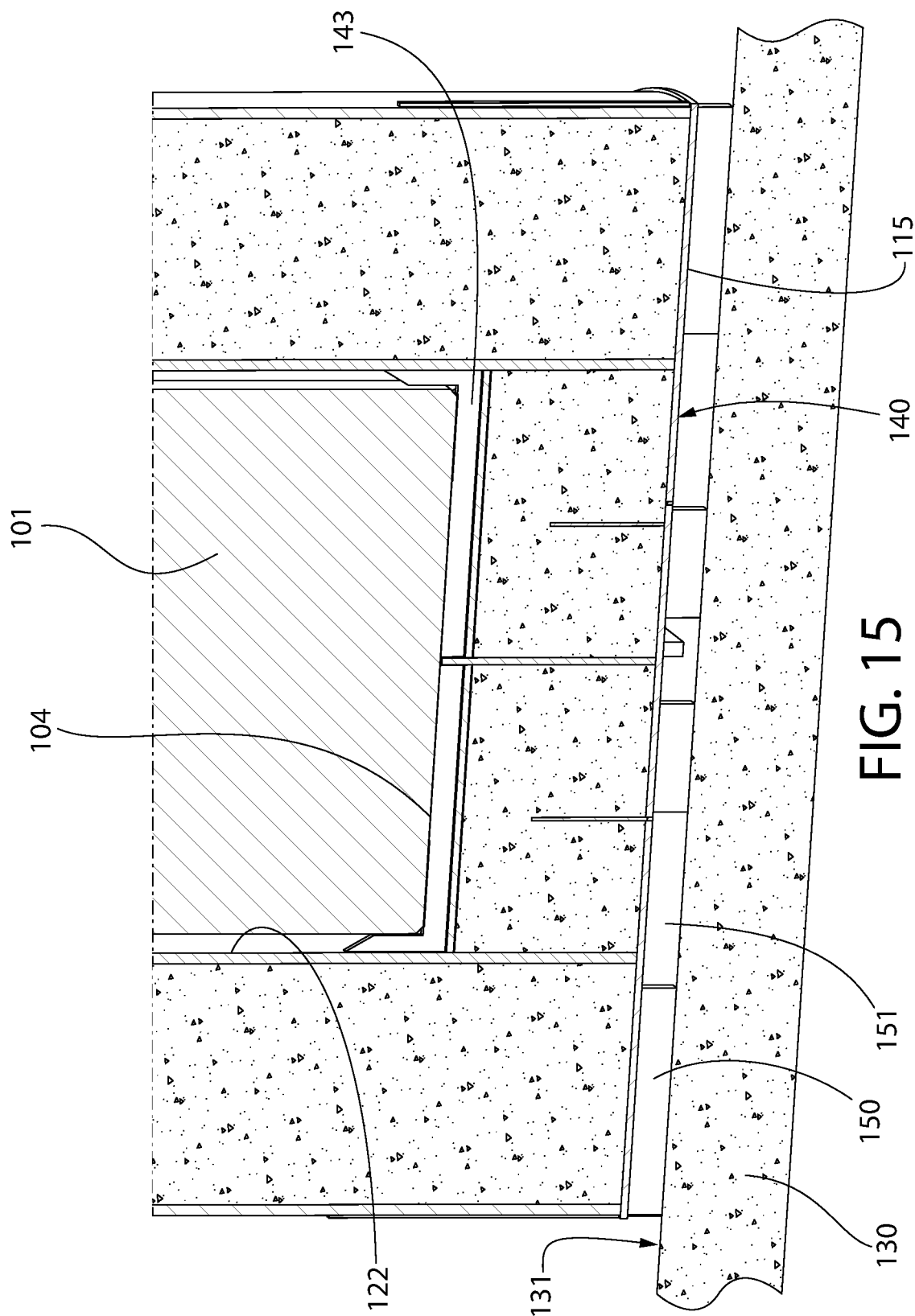
FIG. 15 is a vertical partial cross-sectional view of the lower portion of the cask and concrete base pad supporting the cask.
Figure 16:
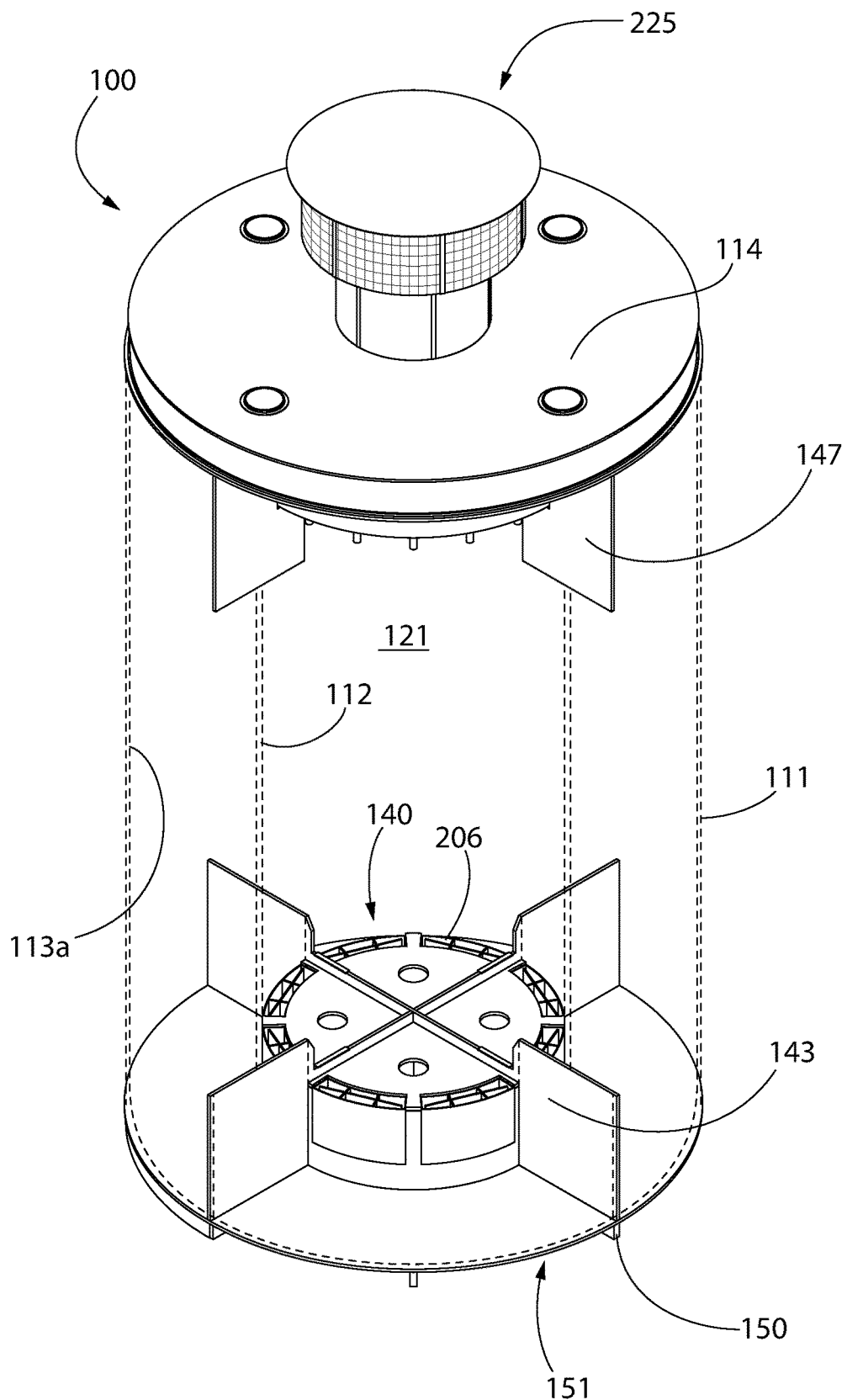
FIG. 16 is a vertical partial cross-sectional perspective view of the of the cask with concrete liner of the sidewall and bottom canister support structure not shown.

All drawings are schematic and not necessarily to scale. Features shown numbered in certain figures are the same features which may appear un-numbered in other figures unless noted otherwise herein.

DETAILED DESCRIPTION

The features and benefits of the invention are illustrated and described herein by reference to exemplary embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled,"

"interconnected," and similar refer to a relationship wherein structures are secured or attached to one another either directly or indirectly through intervening structures, as well as both movable or rigid attachments or relationships, unless expressly described otherwise.

As used throughout, any ranges disclosed herein are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

FIGS. 1-23 depict various aspects and components of a nuclear waste storage system comprising a first embodiment of a passively cooled and naturally ventilated outer nuclear waste storage module or cask 100 configured for holding a nuclear waste canister 101 which contains spent nuclear fuel (SNF) or other high level radioactive waste materials. Cask 100 is constructed and configured for above grade placement in one embodiment such as on a top surface 131 of a flat reinforced concrete base pad 130 slab which may rest on soil or another structure. The cask may be anchored to the base pad if desired via fasteners to prevent shifting during a postulated seismic event or projectile impact.

Canister 101 is a vertically elongated and hermetically sealed (i.e. gas tight) vessel in one embodiment comprising cylindrical shell 103, circular bottom closure plate 104 affixed to a bottom end of the shell, and a circular top closure plate 106 coupled to a top end of the shell. The top and bottom closure plates may be hermetically seal welded to the shell via circumferentially continuous girth seal welds at the weld seams. An interior space 105 is defined within the shell which is configured for holding the SNF fuel assemblies 102 (represented schematically in FIG. 11 by dashed lines) or other high level radioactive waste materials. Such fuel assemblies are well known in the art without further elaboration. For example, a typical rectangular fuel assembly for U.S. style pressurized water reactors (PWRs) is disclosed in commonly-owned U.S. patent application Ser. No. 17/115,005, which is incorporated herein by reference in its entirety. The fuel assemblies 102 contain the fuel rods or "cladding" with decaying uranium which generates considerable heat that must be dissipated to protect the structural integrity and containment of the fuel. This in turn heats the canister which emits the heat. The canister including shell 103 and the top and bottom closure plates 104, 106 preferably may be made of stainless steel in one embodiment for corrosion protection.

Cask 100 may be a heavily radiation-shielded double-walled vessel in one embodiment including a vertically elongated cask body 110 formed by a cylindrical outer shell 111 and inner shell 112, and radiation shielding material 113 disposed in an annular space 113a formed therebetween. The shells 111, 112 and shielding material 113 collectively define the sidewall 110a of the cask. The inner and outer shells are concentrically arranged relative to each other as shown.

In one embodiment, the shielding material 113 of cask body 110 may comprise a high-density concrete mass or liner for neutron and gamma radiation blocking. The concrete in some embodiments may comprise hematite (iron oxide compound $Fe_2O_3$) and/or other iron-containing aggregates which substantially boost the thermal conductivity of the liners resulting in a significant increase in the rate of conductive heat transfer from the inside surface of the cask to the outside surface exposed to ambient atmosphere. Other radiation shielding materials may be used in addition to and/or instead of concrete including lead for gamma radiation shielding, boron containing materials for neutron blocking (e.g. Metamic®, Holtite® or others), steel, and/or others shielding material typically used for such purposes in the art.

Inner shell 112 of the cask body 110 defines an interior or internal surface 112a and outer shell 111 defines an exterior or external surface 111a of the cask. Surfaces 111a, 112a formed by the shells may correspondingly be cylindrical and arcuately curved in one embodiment. The cask body further includes an open top 119 (when not closed by lid 114) defined by the upper end of the cask body sidewall 110a and bottom 120 defined by baseplate 115 at the lower end of the cask body sidewall.

The passively cooled and ventilated nuclear waste storage cask 100 may be vertically elongated and oriented when in use as shown in the illustrated embodiment. The inner and outer shells 112, 111 may be formed of a suitable metallic material, such as without limitation steel (e.g. carbon or stainless steel). If carbon steel is used at least the exterior surface 111a of the cask may be epoxy painted/coated for corrosion protection. The metal shells 111, 112 may each have representative thickness of about ¾ inches as one non-limiting example; however, other suitable thicknesses may be used.

Cask 100 comprises a vertically-extending internal cavity 121 which extends along a vertical longitudinal or centerline axis CL defined by and passing through the geometric centerline of the elongated cask. Cavity 121 may be of cylindrical configuration in one embodiment with a circular cross-sectional shape; however, other shaped cavities with corresponding cross-sectional shapes may be used including polygonal shapes and other non-polygonal shapes (e.g. rectilinear, hexagon, octagonal, etc.).

Cask 100 further includes a radiation shielded canister support structure 140 disposed at the bottom 120 of the cask body 110 which essentially closes the bottom end of internal cavity 121 of the cask (except for the cooling air inlet structure further described herein to allow ambient ventilation air to enter the cavity at bottom). The canister support structure 140 is configured to support and elevate the canister 101 within the internal cavity of the cask in the manner shown. Canister support structure 140 has a composite construction which comprises lower and outermost baseplate 115, upper top plate 141 facing and disposed inside the internal cavity 121 at bottom, peripheral cylindrical vertical shell 144 extending therebetween, and concrete liner 142 for enhanced radiation shielding filling the interior space created by the shell and the top and bottom plates. Top plate 141 and baseplate 115 may be circular and flat. Baseplate 115 projects radially outwards beyond the vertical shell 144 (see, e.g., FIGS. 4-5). The baseplate covers the entire bottom of cask body 110 and extends circumferentially along the entire bottom end of the outer shell 111 of the cask body at the perimeter of the cask. The baseplate 115, top plate 141, and vertical shell 144 of the canister support structure may be welded together to form a permanently joined assemblage. Multiple fill holes 145 are provided in top plate 141 to pour the concrete liner into each quadrant of the assemblage after welding which is defined by the canister support rib plates 143 of canister support structure 140 as further described herein.

Baseplate 115 may be hermetically seal welded to the bottom ends of the inner and outer shells 112, 111 at the bottom 120 of the cask body and structurally supports the shells. Top plate 141 has a smaller diameter than baseplate 115 and is disposed and elevated inside the cask internal cavity 121 spaced upwards from the bottom of the cask. Top plate 141 and baseplate 115 may each have a flat and circular configuration in one non-limiting embodiment as shown. The top plate includes a flat upward facing top surface 141a which is exposed inside the cask internal cavity 121. Baseplate 115, top plate 141, and shell 144 of canister support structure 140 may be made of a similar metallic material as the shells 111, 112 (e.g., steel or stainless steel). In one embodiment, baseplate 115 may be about 3 inches thick. The bottom surface 115a of baseplate 115 defines the bottom of the cask 100.

The canister support structure 140 forms a pedestal for supporting canister 101 in cask internal cavity 121 and further comprises an assemblage of multiple intersecting canister support rib plates 143 which are an integral part of the support structure. In one embodiment, canister 101 is supported by and seated directly on the rib plates Rib plates 143 are elongated in length and extend radially between opposing diametrically opposite portions of the sidewall 110a of the cask body 110. The rib plates are embedded in the sidewall 110a (including concrete liner 113) and have vertical outer ends 143a which may be welded to outer shell 111 of the cask. Ends 143a may protrude completely through complementary configured slots 143b in the outer shell in one embodiment for additional structural support by the shell base material in addition to the weldments thereto.

The horizontal bottom edges 143c of rib plates 143 may be welded to the top surface of the baseplate 115. Rib plates 143 protrude upwards above the top surface 141a of top plate 141 of the canister support structure such that their horizontal top edges 143d are spaced apart above surface 141a of the top plate to engage the bottom closure plate 104 of canister 101 seated thereon. This elevates the canister and forms a gap or space between canister bottom closure plate 104 and top surface 141a of top plate 141 which allows heat emitted from the bottom of canister 101 to be drawn away by the ambient cooling air flowing through internal cavity 121 of the cask 100.

Rib plates 143 in one embodiment may further include a stepped shoulder 143a formed in top edge 143d of the plates adjacent inner shell 112 inside the cask internal cavity 121. Shoulders 143a engage the sides of the canister shell 103 to center and stabilize the canister in the cask during transport and in the case of a seismic event. In one embodiment, the shoulders 143a are preferably configured to space the canister shell 103 apart from the inner surface 112a of the cask inner shell 112 such that a substantially uniform ventilation annulus 122 (further described herein) is maintained between the cask 100 and canister when the canister is positioned in internal cavity 121 of the cask.

In one embodiment, rib plates 143 may be arranged in an "X" shaped intersecting pattern as shown. The intersection of the plates 143 may fall on the vertical longitudinal or centerline axis CL of the cask. Rib plates 143 may be welded to each other at the intersection in some embodiments. Such an intersecting arrangement strengthens the rib assemblage particularly since the central portion of rib plates 143 are embedded in the concrete liner 142 of the canister support structure 140 (see, e.g., FIG. 5).

Cavity 121 of cask 100 has a configuration in transverse cross-sectional area (perpendicular to centerline axis CL) and height suitable for holding a single SNF canister 101 therein which holds the SNF assemblies or other high level radioactive waste. The internal diameter of cask cavity 121 is intentionally larger than the diameter of the fuel canister 101 to form a ventilation annulus 122 between the canister 101 and inner shell 112 when the canister is emplaced in the cask. The radial width of annulus 122 preferably is sufficient to draw heat generated by the nuclear waste within the canister away from the canister as the cooling ventilation air flowing upwards alongside the canister. The upward flow of cooling air in the annulus is automatically driven via a natural convective thermo-siphon effect as the air becomes heated by the canister 101. A typical airflow annulus may be in the range of about and including 2-8 inches in radial width as a non-limiting example depending on the estimated heat load of the fuel canister 100 and ventilation cooling air flow needed. The air flowrate is selected to maintain the desired canister maximum temperature limit. It bears noting that the canister support rib plates 143 maintain the annulus 122 even during occurrence of a seismic event to ensure cooling air can continue to reach the canister.

The ventilation annulus 122 extends vertically for at least the full height of the canister and preferably slightly above. The upper portion of canister 101 is laterally/radially supported and centered by a plurality of upper guide members 117 discussed below. Accordingly the canister 101 has a height approaching the full height of the cask cavity 121, and at least greater than ¾ the height of the cavity. Annulus 122 further extends all the way down to the top plate 141 of the canister support structure 140 and is in fluid communication with the air inlet 200 of the cask in structure 140, as further described herein.

The radially and vertically extending guide members 117 are disposed in the upper portion of the cask cavity 121. The array of upper guide members 117 are circumferentially spaced apart and rigidly attached to the interior/internal surface 112a of the inner shell 112 such as via welding. Guide members 117 may be formed of steel plates (e.g., lugs) or tubes, and are provided around the entire inner shell at least at the upper portion in cavity 121 for full 360 degree coverage. The inward vertical sides or edges of the guide members are configured to abuttingly engage and center the canister 101, which prevents excessive laterally/radially movement and rattling thereof if vibrated during a seismic event, transport, or when being lifted/lowered by a crane or hoist from or into the cask internal cavity 121. Notably, the guide members 117 further act to maintain the ventilation annulus 122 between canister 100 and inner shell 112 in the upper portion of the cask cavity 121 to preserve this airflow passage for removing heat emitted by the canister. This ensures that a continuous available flow of ambient cooling can to circulate around and flow upwards along the sides of the canister for cooling.

A radiation-shielded lid 114 is detachably coupled to the top 119 of cask body 110 and closes the normally upwardly open cavity 121 of cask 100 when in place (except for the cooling/ventilation air outlet path through the lid). Air outlet 220 of the cask ventilation system is formed through the lid. The lid 114 may have a "disk and donut" configuration in one embodiment comprising an upper annular member 114a defining a central air outlet opening 114f and lower disk member 114b rigidly coupled thereto. Disk member 114b is sized to fit inside the top end of cask internal cavity 121. Annular lid member 114a rests on the top 119 of the cask body 110 on sidewall 110a when the lid is in place. More specifically, lid member 114a is seated on annular top closure plate 119a which is fixedly welded to the top ends of inner and outer shells 112, 111. Multiple fill holes 145 may be formed in closure plate 119a for pouring the concrete liner 113 between the inner and outer shells 112, 111 of radiation shielded cask body 110. Lid member 114a is detachably coupled to cask body 110 via a plurality of threaded fasteners 146 each secured to a vertical steel lifting plate 146 embedded in the concrete liner 113 at the top of the bask body and welded to the inner and outer shells 112, 111 (see, e.g., FIGS. 12 and 14).

Lid 114 comprised of the annular and disk members 114a, 114b is a composite structure comprising a hollow metal outer housing 114c defining an interior space filled with a radiation shielding material 114d such as a high-density concrete liner encased by the outer housing. Other shielding materials may be used in addition to or instead of concrete. Lid 114 provides radiation shielding in the vertical upward direction, whereas the concrete liner 113 disposed between the inner and outer shells 112, 111 provides radiation shielding in the lateral or radial direction. With exception of the concrete liner, the housing 114c is preferably formed of a metal such as without limitation steel (e.g. carbon or stainless) capable of withstanding projectile impacts or other sources of potential damage.

According to one aspect of the nuclear waste fuel storage system, the vertical ventilated nuclear fuel storage cask 100 includes a natural circulation cooling air ventilation system (i.e. unpowered by fans/blowers) for removing decay heat emitted from the canister 101 which holds the SNF or other high level nuclear waste material. The cooling airflow provided by ambient air surrounding the cask is driven by a natural convective thermo-siphon effect in which air within the ventilation annulus 122 is heated by the canister 101 (containing the decaying SNF or other nuclear waste material) causing an upflow which draws ambient cooling air into the cask at bottom through the air inlet 200 in the canister support structure 140.

The cask cooling air ventilation system will now further be described in further detail.

Referring generally to FIGS. 1-23 as applicable, the cask ventilation provisions include a cooling air inlet 200 formed in the bottom of cask 200 through canister support structure 140 and cooling air outlet 220 formed through the lid. Air inlet and outlet 200, 220 are in fluid communication with ambient atmosphere and the internal cavity 121 of cask 100, and more particularly ventilation annulus 122 formed when the nuclear waste canister 101 is in position in the cavity.

The air inlet 200 comprises downwardly open air inlet openings 201 formed through horizontal flat baseplate 115 of the canister support structure 140 which is affixed to the bottom of the cask body 110. Air inlet openings 201 provide the fluid connection of the lower portion of cask internal cavity 121 to ambient atmosphere via the air inlet in the canister support structure. Air inlet openings 201 may be arranged in a circular array in one embodiment which is concentrically and coaxially aligned with the vertical centerline axis CL of the cask.

Air inlet 200 comprises inlet ductwork 208 collectively defined by a plurality of compound shaped air inlet ducts 202 formed within and extending through be canister support structure 140 including concrete liner 142. The air inlet ductwork of the ventilated cask 100 therefore does not penetrate the sidewall of the cask (i.e. inner shell 112, outer shell 111, and concrete liner 113) to prevent radiation streaming in the radial/lateral direction to the ambient environment where workers may be present. In the non-limiting illustrated embodiment, eight inlet ducts 202 are provided (two located within each quadrant of the cask and its internal cavity 121 (see, e.g., FIG. 13). Other numbers of inlet ducts however may be provided in other embodiments and does not limit the invention. The inlet ducts 202 are preferably arranged in a tightly spaced circular or annular array or grouping such that the lateral spacing between adjacent ducts is less than the lateral width of each duct. This tight grouping beneficially ensures that the cylindrical shell 103 of canister 101 is evenly and adequately cooled by a circumferentially-extending curtain of ambient cooling air, as further described herein.

The individual inlet ducts 202 of the inlet ductwork 208 in canister support structure 140 each have a compound configuration designed such that no straight line of sight exists between the internal cavity 121 of cask 100 (including ventilation annulus 122) and the air inlet openings 201 in the baseplate 115 or ambient environment. This prevents straight line radiation streaming in the downwards direction through the air inlet ducts.

Accordingly, in one embodiment, each air inlet duct 202 may include a hollow metal body having generally Z-shaped transverse cross-sectional shape formed by, in operable fluid communication: a vertical lower entrance portion 203 fluidly coupled to a respective air inlet opening 201 in baseplate 115; a vertical upper exit portion 204 fluidly coupled to the ventilation annulus 122 in the internal cavity 121 of the cask body 110; and a radial/horizontal intermediate portion 205 fluidly coupled between the entrance and exit portions. Lower entrance portion 203 of each inlet duct 202 is located radially inwardly from its respective upper exit portion 204 and therefore is closer to the vertical centerline axis CL of the cask body. Inlet ducts 202 extend through the concrete liner 142 of the canister support structure 140 in the zig-zag shape shown and may be formed of steel or another suitable metal. The ducts 202 may be welded to the baseplate 115 and top plate 141 of the canister support structure before concrete is filled therebetween embedding the ducts in the concrete.

The upper exit portions 204 of air inlet ducts 202 each define an upwardly discharging air exit opening 206 which discharges and introduces ambient cooling air passing through the ducts into the bottom of internal cavity 121 of cask 100, and more particularly the bottom of the ventilation annulus 122. The upper exit portions 204 and exit openings 206 are therefore located adjacent to sidewall 110a of the cask body 110 and at the bottom of the ventilation annulus. In one embodiment, ducts 202 are arranged as previously described herein such that their corresponding air exit openings 206 of the ducts concomitantly form a circular or annular array openings adjacent to cask inner shell 112 which in turn is concentrically aligned with the vertical centerline axis CL of the cask (see, e.g., FIGS. 4 and 13). Advantageously, ambient cooling air is discharged and introduced axially and vertically upwards into the ventilation annulus (parallel to centerline axis CL) to form a circumferentially-extending cooling air curtain surrounding the canister for 360 degrees. Each quadrant of the canister is therefore equally cooled in a balanced manner to minimize or prevent localized "hot spots" on the canister shell. It bears noting that the very small gaps between adjacent air inlet ducts 202 as shown in the figures have no practical effect on effectiveness of cooling the canister since the incoming ambient cooling air between the ducts mixes upon entry into the bottom of ventilation annulus 122.

It is further notable that introducing the ambient cooling air in the vertically and axially upwards direction into the ventilation annulus 122 of cask 100 (parallel to cask centerline axis CL) as opposed to introducing the air radially into the annulus through the sidewall of the cask 100 provides additional benefits. The present cooling air vertical introduction path in which air flows upwards parallel to the sides of the canister (and cask vertical centerline axis CL) enhances canister cooling since it creates less turbulence when compared to radial introduction of cooling air into the cask which strikes the canister perpendicularly and disperses. The translates into reduced airflow resistance and a greater naturally driven convective cooling air flow rate (CFM-cubic feet per minute) via the thermo-siphon effect to cool the canister 101 and fuel assemblies therein. This is notable particularly since the passive cooling air flow is unassisted by a fan or blower. Furthermore, the vertically upwards introduction of ambient cooling air into the cask internal cavity 121 flows in the same direction as the air heated by the canister which naturally rises and flows upwards via the natural thereto-siphon effect.

According to another aspect of the cask ventilation cooling system, cask 100 is raised or elevated above the concrete base pad 130 by a plurality of standoff members 150 protruding downwards from baseplate 115 to engage the pad. Standoff members 150 collectively support the entire weight the cask 100 and canister 101 with fuel assemblies loaded therein. In one embodiment, standoff members 150 may comprise steel plates of an elongated rectangular form as shown. However, other shaped standoff members may be used. To evenly distribute the weight the loaded cask 100, the standoff members 150 may comprise a circular outer array of outer standoff members 150a and a circular inner array of inner standoff members 150b. Standoff members 150a, 150b are circumferentially spaced apart with respect to the other standoff members in each of their respective arrays. Outer standoff members 150a are spaced radially outwards from the inner standoff members 150b on the bottom baseplate 115. The circumferential spacing allows ambient cooling air to be drawn radially inwards beneath the baseplate 115 of the cask and upwards into the circular array of air inlet openings 201 formed therein. In one embodiment, the inner standoff members 150b may be located closer to centerline axis CL of cask 100 than and inside of the air inlet openings 201.

With respect to the natural thermo-siphon cooling air ventilation system, standoff members 150 form an air inlet plenum 151 beneath the cask 100 due to vertical spacing or gap between baseplate 115 and the concrete base pad 130. The standoff members 150 are spaced apart as noted above which plays the important function of allowing ambient air to enter the plenum and reach the air inlet openings 201 of the air inlet ducts 202. An inflow of ambient air enters the plenum 151 from a full 360 degrees around the entire bottom perimeter of the cask 100. Cooling air is drawn through/between standoff members 150 into the plenum and then enters internal cavity 121 of the cask via the air inlet openings 201 of the ducts 202 formed in the baseplate 115.

Advantageously, because the inlet openings 201 are formed as cuts or openings in the flat horizontal baseplate 115 of canister support structure 140, the inlets are relatively insensitive to the direction of the wind since the ambient air first collects in the air inlet plenum 151 formed beneath the baseplate 115 before vertically rising and entering the air inlet openings. This contrasts to designs in which ventilation air inlet openings or penetrations are formed in the lateral sides of the cask body. The wind can cause air pressure to be greater on the windward side of the cask than the leeward side, thereby resulting in unbalanced and preferential flow rates of cooling air entering the cask. This can unevenly cool portions of the canister 101, particularly if the hot spots on the SNF canister are on the leeward side of the cask which receives less cooling air. By contrast in the present vertical air inlet design of cask 100, however, the inlet plenum 151 from which the cooling air is drawn into the cask is naturally pressure balanced and the air thoroughly mixed resulting in more uniform inlet air pressure and even cooling of all sides the canister.

Turning now to the upper end of the cask 100, the cooling air outlet 220 of the ventilation system in lid 114 is formed by a plurality of outlet ducts 221 extending between upper annular member 114a defining the central air outlet opening 114f and lower disk member 114b previously described herein. Outlet ducts 221 are in fluid communication with cask internal cavity 121 at bottom and air outlet opening 114f at top which is in fluid communication with ambient atmosphere via a hollow tubular top weather protection cap structure 225 which forms an upwardly protruding lid extension as shown. Cap structure 225 may comprise a vertical cylindrical sidewall 226 fitted with a perforated vent screen 227 on its upper portion and preferably solid top cover plate 228 to prevent the direct ingress of rain into the cap. Vent screen 227 may have an open area of approximately 50% in one non-limiting embodiment; however, other open areas may be used. An open interior 229 is defined inside cap structure 225 which is in fluid communication at bottom with the air outlet opening 114f in the lid upper annular member 114a and laterally/radially to ambient atmosphere through the vent screen 227.

Outlet ducts 221 in lid 114 have a circuitous shape in transverse cross section such that no straight line of sight exists between cask internal cavity 121 and outlet opening 114f or the ambient environment. This prevents straight line radiation streaming in the upward direction as exemplified by the flow path followed by the heated cooling air described below.

Figure 19:
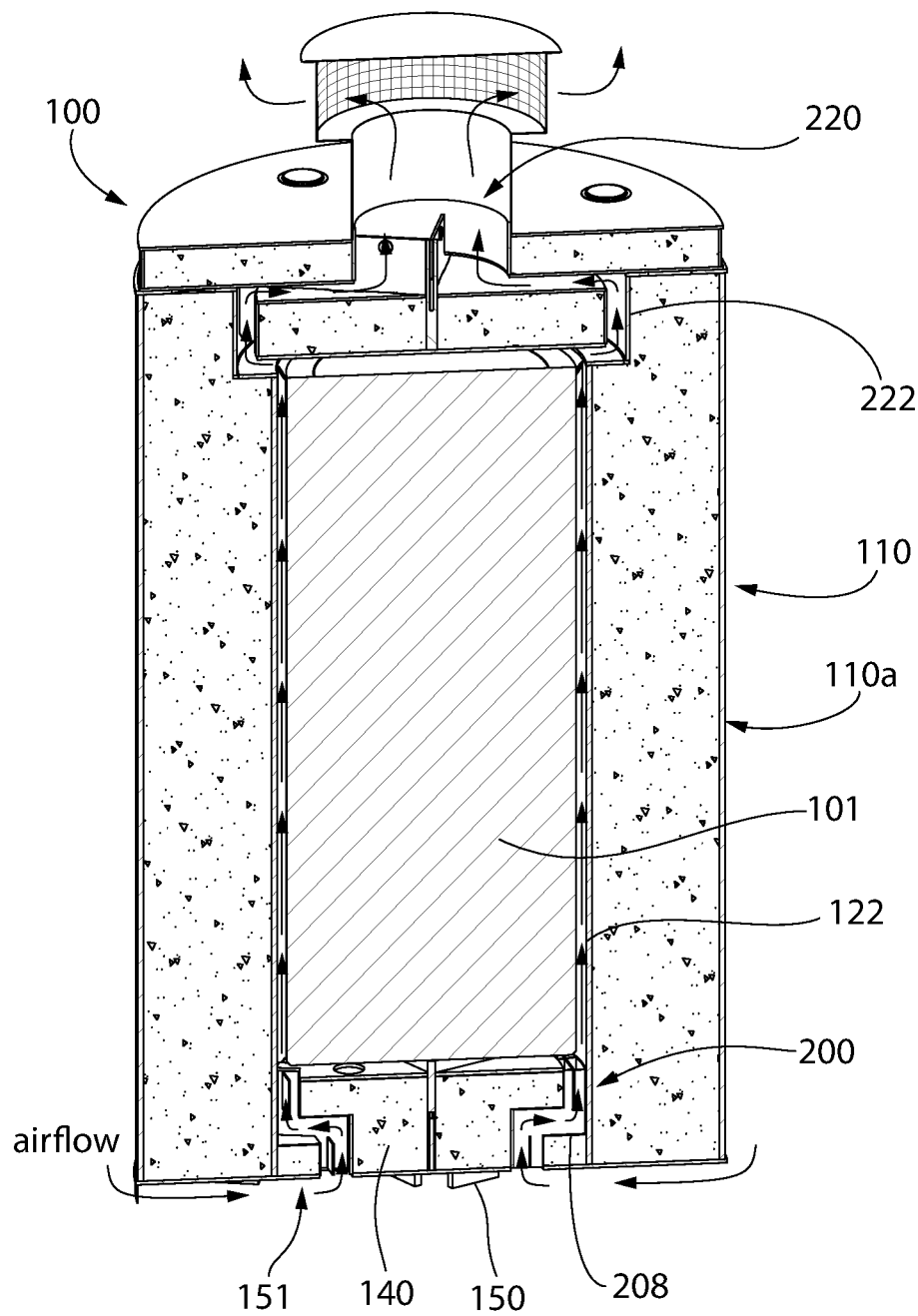
FIG. 19 is another vertical cross-sectional view of the cask with a spent nuclear fuel canister positioned in the cask.
Figure 20:
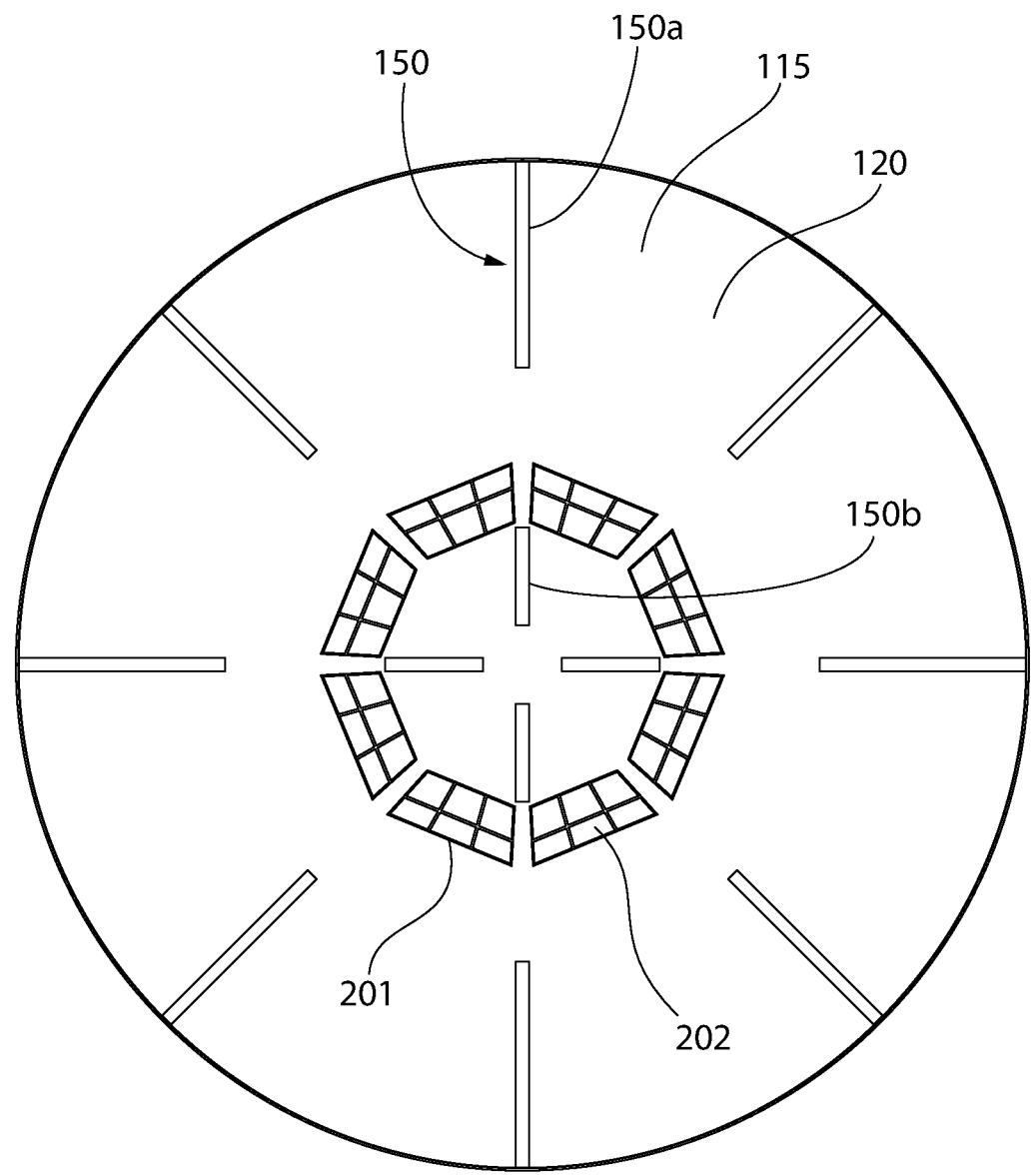
FIG. 20 is a bottom view of the cask.
Figure 21:
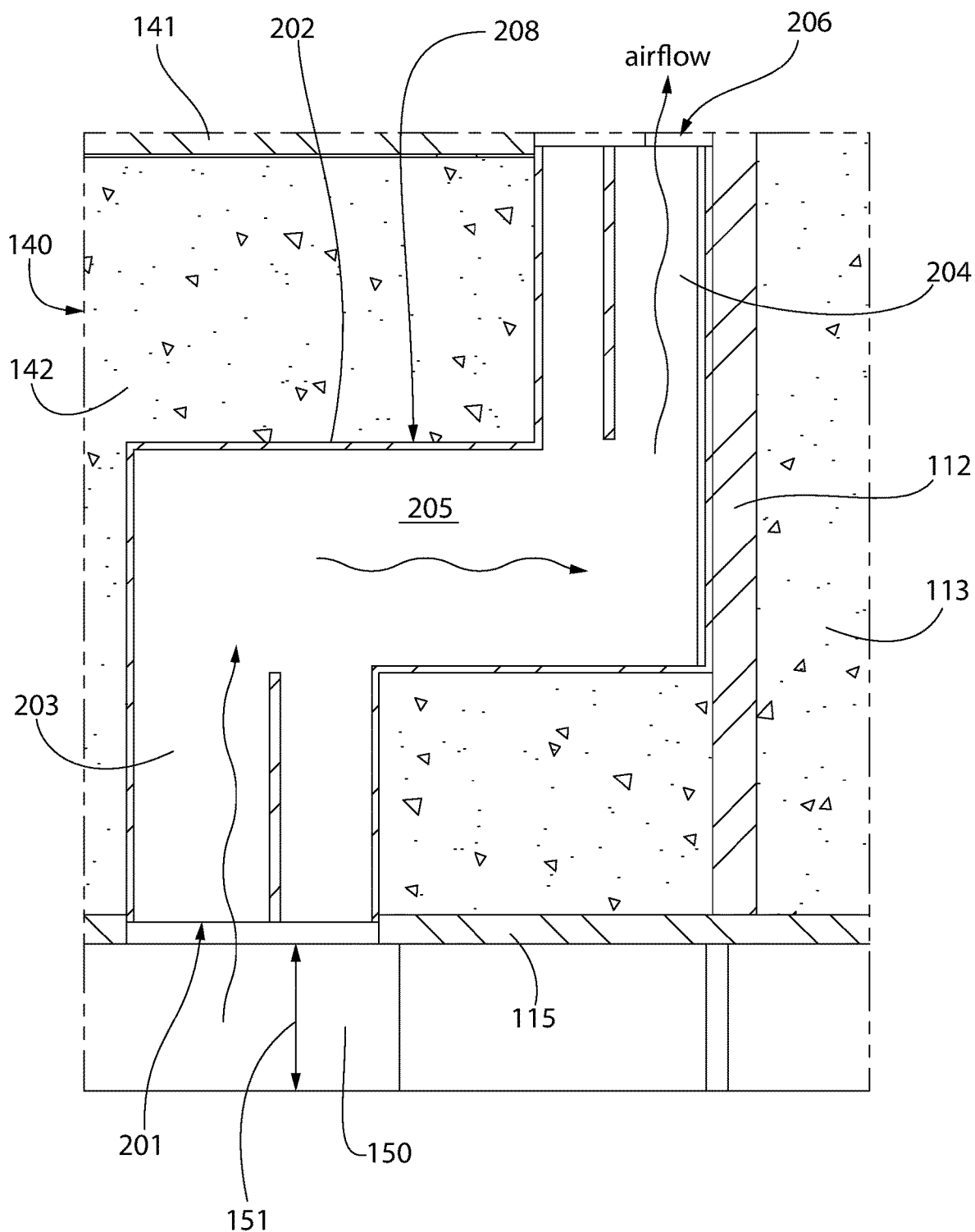
FIG. 21 is an enlarged vertical cross sectional view of an air inlet duct of the canister support structure.

A method for operation of the natural convective thermo-siphon air ventilation system will now be summarized. FIG. 19 is a cross sectional view of cask 100 showing the cooling air flow path therethrough and corresponding directional flow arrows.

In operation, referring to FIG. 19 and other applicable figures, ambient cooling air is first drawn radially inwards into inlet plenum 151 between standoff members 150 from the ambient environment a full 360 degrees around the bottom of the cask 100. The air then mixes first and flows vertically upwards through air inlet openings 201 in baseplate 115 of canister support structure 140 and enters the inlet ducts 202. The air flows vertically upwards, then radially outwards, and finally vertically upwards in ducts 202. The still cool ambient air is drawn into the bottom of ventilation annulus 122 of cask 100 from the annular array of upward discharging duct exit openings 206 of the inlet ducts.

Canister 101 heats the incoming air in ventilation annulus 122 which rises upwards and collects in an annular air outlet plenum 222 formed within cask internal cavity 121 between inner shell 112 and lower disk member 114b of the lid. The now heated cooling air flows vertically upwards in the plenum and then turns radially inwards through outlet duct 221 to central outlet opening 114f in upper annular member 114a of the lid. The heated cooling air continues to flow vertically upwards inside cap structure 225 and then is discharged radially/laterally outwards through vent screens 227 to ambient atmosphere. Heating of the air in the ventilation annulus 122 by the fuel assemblies within the canister 101 drives the foregoing air circulation continuously as long as heat is emitted by the canister.

Figure 17:
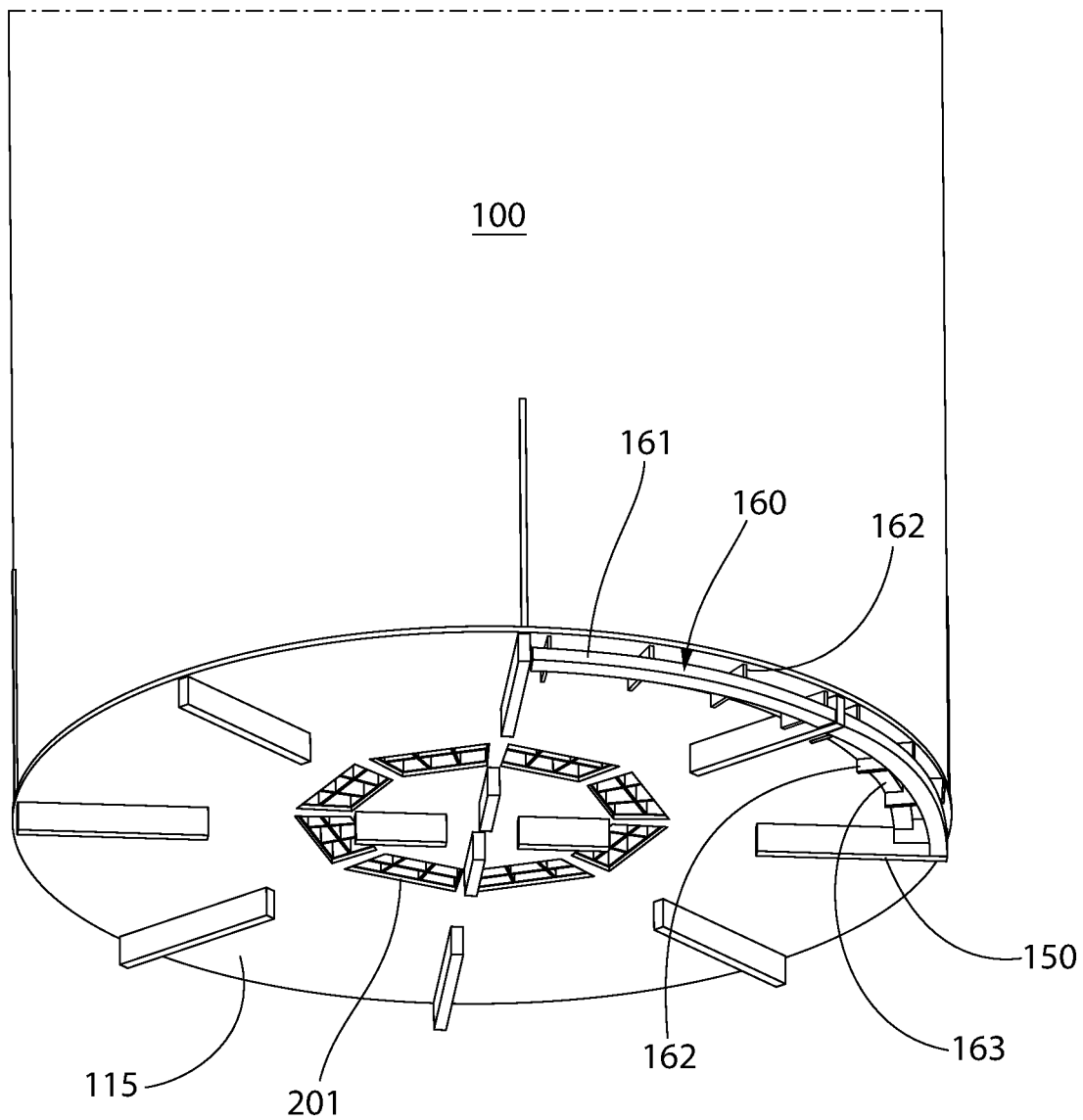
FIG. 17 is a bottom perspective view of the bottom of the cask showing installed curved radiation photon scattering attenuators.

According to another aspect of the nuclear waste storage system, the air inlet region of cask 100 may be supplemented where needed for increased radiation blockage with photon attenuators. These may be perimetrically positioned in spaces beneath the cask body 110 and only in locations of potential increased radiation levels such as along cask storage area borders or fences in close proximity to the loaded casks containing SNF or other high level radioactive waste. FIG. 17 shows the underside of a certain embodiment of cask 100 including arcuately curved radiation photon scattering attenuators 160. The attenuators provided are each fixedly coupled between a pair of the radial plate outer standoff members 150a in the outer array of standoffs on the bottom baseplate 115 previously described herein. A pair of attenuators is shown in this figure; however, more or less can be used as needed. The attenuators 160 are configured with open areas to allow the ambient cooling air to flow inwards into the bottom air inlet plenum 151 of the natural ventilation system towards the air inlet 200 in canister support structure 140. In the non-limiting illustrated embodiment, each attenuator 160 may comprise an arcuately curved outer support bar 161 and optional inner support bar 163 which may each be welded at their ends to opposing standoff members 150a welded in turn to the bottom of baseplate 115. A plurality of vertically orientated flat deflector plates 162 are welded to and arcuately spaced apart on the bars 161, 163 as shown. Plates 162 may be optionally welded to baseplate 115 in additional if needed for added stability and support. In some embodiments, the bottom surfaces of the outer support bars 161 may be flush with the bottom surfaces of the outer standoff members 150a as shown so that the bars rest on the concrete base pad 130 with the standoffs. This provides added support for the attenuators 160 and cask. In one embodiment, support bars 161, 163 and deflector plates 162 may be formed of metal such as steel or another suitable metal. As shown in FIG. 17, attenuators 160 are only located where required and not necessarily around the entire perimeter of the cask bottom.

Figure 18:
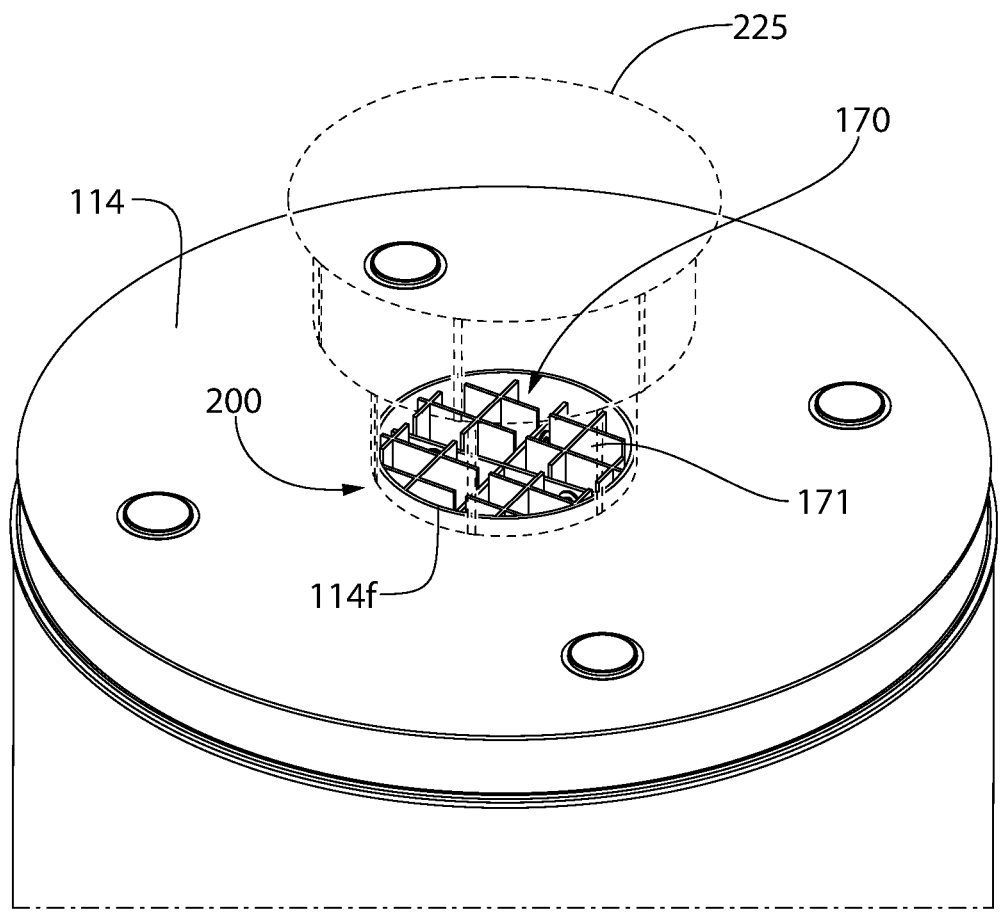
FIG. 18 is a top perspective view of the upper portion of the cask showing a radiation photon scattering duct attenuator installed in the air outlet duct of the ambient air ventilation system of the cask.
Figure 23:
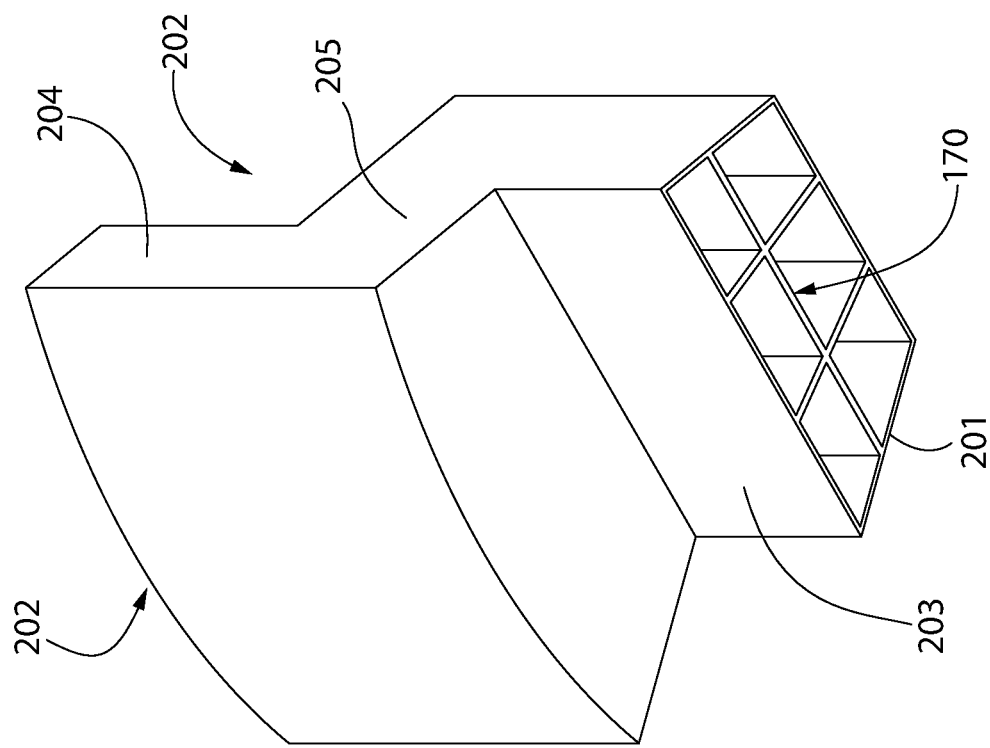
FIG. 23 is a bottom perspective view of the air inlet duct.
Figure 22:
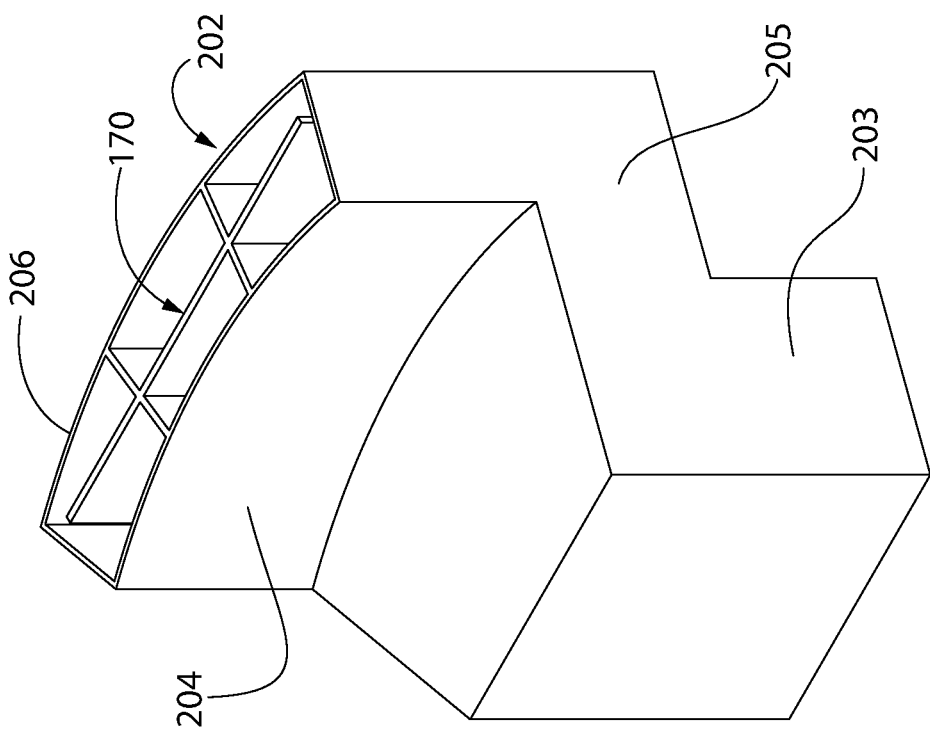
FIG. 22 is a top perspective view of the air inlet duct.

FIG. 18 shows gridded radiation photon scattering duct attenuator 170 installed in the air outlet 220 of the cask ventilation system. The duct attenuator 170 is formed by an orthogonally intersecting array of steel or other metallic flat duct deflector plates 171 which may be fitted inside central air outlet opening 114f in lid 114. FIGS. 22-23 show a similar gridded duct attenuator 170 installed in inlet ducts 202 of canister support structure 140 at both the air outlet 206 and air inlet 201 of each duct.

Features and advantages of the present cask with ambient cooling air ventilation system include but are not limited to the following. The high-density concrete liners 113 and 142 of the cask sidewall and canister support structure 140 respectively may comprise hematite (iron oxide compound $Fe_2O_3$) and/or other iron-containing aggregates which substantially boost the thermal conductivity of the liners resulting in a significant rate of conduction heat transfer from the inside surface of the cask to the outside surface. The heat duty of the cask is therefore accordingly increased to dissipate heat emitted by the canister 101. Cask 100 has superior radiation shielding performance attributable to no lateral/radial or vertical streaming paths for radiation emanating from the nuclear fuel stored in the canister inside the cask. This also creates the absence of any open intrusion path for small penetrant missiles that can reach the nuclear fuel inside the cask. Air inlet and outlet openings optionally equipped with duct photon attenuators 170 which act to further attenuate radiation thereby decreasing ambient levels of radiation. Any minute dose allowed from the bottom region of the cask may be further reduced by using arcuately curved photon attenuators 170 at the periphery of the air inlet plenum 151 beneath the cask. The penetration for the air outlet in the top lid features the "disk & donut" geometry previously described herein with a large overlap in the planar horizontal direction at the cask body 110 to lid 114 interface such that there is no path for direct vertically upwards streaming of radiation from the cask internal cavity holding the canister to the ambient environment. The structurally robust concrete and steel disk part of the lid also serves to block any incoming missile or projectile. The width of the air inlet and outlet flow passages (e.g. ducts) can be optimized to meet the needed heat duty of cask 100 without permitting excessive amounts of diffused radiation inside the cask from reaching the ambient environment. The ventilated cask 100 is configured and suited for sheltered or unsheltered deployment on the concrete storage or base pad 130. The cask can therefore be stored inside a building that has adequate ventilation, or in unsheltered storage facilities out in open air to facilitate improved ventilation and cooling of the cask.

While the foregoing description and drawings represent some example systems, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. A method for operating a passively ventilated nuclear fuel storage system comprising:
   providing a cask comprising an internal cavity and an ambient air ventilation system in fluid communication with the internal cavity and atmosphere;
   inserting a canister containing nuclear waste emitting heat into the internal cavity of a cask and onto a canister support structure fixedly coupled to the cask;
   drawing ambient cooling air into an air inlet plenum formed beneath the cask;
   flowing the cooling air upwards from the air inlet plenum through the canister support structure into the internal cavity of the cask;
   heating the cooling air in the internal cavity of the cask; and
   discharging the heated cooling air to atmosphere through a lid coupled to a top of the cask.

2. The method according to claim 1, wherein the cooling air is heated by the canister in a ventilation annulus formed between the cask and canister in the internal cavity.

3. The method according to claim 1, wherein the cooling air flows vertically upwards into the ventilation annulus from the canister support structure.

4. The method according to claim 1, wherein the cooling air flows into the internal cavity of the cask through plurality of air inlet ducts formed vertically through the canister support structure, and the cooling air flows outwards from the internal cavity through a plurality of air outlet ducts in the lid.

5. The method according to claim 4, wherein the air inlet ducts and air outlet ducts are each arranged in a circumferentially-extending annular array in the canister support structure and lid, respectively.

6. The method according to claim 5, wherein no straight line of sight exists through the air inlet and outlet ducts to prevent radiation streaming.

7. The method according to claim 1, wherein the drawing step comprises drawing air radially inwards into the air inlet plenum which is formed between a baseplate of the canister support structure and concrete base pad which supports the canister.

8. The method according to claim 7, wherein the air inlet plenum is formed by a plurality of standoff members which elevate the baseplate apart from the base pad.

9. The method according to claim 1, wherein there are no penetrations in a sidewall of the cask associated with the ventilation system.

* * * * *